US012359620B2

(12) United States Patent
Maldonado et al.

(10) Patent No.: US 12,359,620 B2
(45) Date of Patent: Jul. 15, 2025

(54) COOLING FEATURES FOR A COMPONENT OF A GAS TURBINE ENGINE

(71) Applicant: RTX Corporation, Farmington, CT (US)

(72) Inventors: Billie R. Maldonado, Seattle, WA (US); Thurman C. Dabbs, Dover, NH (US); James R. Plante, East Waterboro, ME (US); Paul M. Lutjen, Kennebunkport, ME (US); Dmitriy A. Romanov, Portland, ME (US); Morely S. Sherman, Portsmouth, NH (US); Nolan Frederic Quinn, Troy, NY (US); Mary E. M. Hiller, Wells, ME (US); Jon Moore, Charlottesville, VA (US); John R. Paulus, Afton, VA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/379,958

(22) Filed: Oct. 13, 2023

(65) Prior Publication Data
US 2024/0125272 A1   Apr. 18, 2024

Related U.S. Application Data

(60) Provisional application No. 63/415,802, filed on Oct. 13, 2022.

(51) Int. Cl.
F01D 5/18    (2006.01)
F01D 25/12   (2006.01)
F02C 7/18    (2006.01)

(52) U.S. Cl.
CPC ............... F02C 7/18 (2013.01); F01D 5/187 (2013.01); F01D 25/12 (2013.01); F05D 2250/70 (2013.01); F05D 2260/232 (2013.01)

(58) Field of Classification Search
CPC . F01D 5/187; F01D 9/06; F01D 9/065; F01D 11/24; F05D 2260/22141;
(Continued)

(56) References Cited

U.S. PATENT DOCUMENTS 5,538,394 A * 7/1996 Inomata .................... F28F 3/02
                                              415/115
8,598,553 B2   12/2013 Appleby et al.
(Continued)

FOREIGN PATENT DOCUMENTS

FR    3107919 B1    12/2022
JP    2009041433 A   2/2009
(Continued)

OTHER PUBLICATIONS

European Search Report corresponding to EP Application No. 23203578.2; Mailing Date, Feb. 22, 2024.

Primary Examiner — Justin D Seabe
(74) Attorney, Agent, or Firm — CANTOR COLBURN LLP

(57) ABSTRACT

A component for a gas turbine engine, including: at least one internal cavity extending through the component, the internal cavity having at least one inlet opening and at least one outlet opening each being in fluid communication with the at least one internal cavity; a plurality of cooling features extending from a surface of the at least one internal cavity, the plurality of cooling features are formed in accordance with at least one of the following groups: i) a plurality of airfoil shaped features that extend upwardly from the surface of the at least one internal cavity and a plurality of wedge shaped features each having a triangular base that has an upstream portion and a downstream portion, the upstream portion extending further from the surface than the down-
(Continued)

stream portion; ii) a plurality features having a curved or "J" shaped base that extends upwardly from the surface, a plurality features having a double curved or symmetrically "J" shaped base that extends upwardly from the surface, and a plurality features having a base that extends upwardly from the surface with a curved portion that defines an opening therethrough; iii) a first plurality of pins with a plurality of grooves that are formed into a peripheral surface of each of the first plurality of pins and a second plurality of pins with a plurality of grooves that are formed into a peripheral surface of each of the second plurality of pins the plurality of grooves formed in the peripheral surface of each of the second plurality of pins are configured such that "V" shapes or inverted "V" shapes are formed in the peripheral surface of each of the second plurality of pins; and iv) a plurality of chevron shaped trip strips that are located in a channel, the plurality of chevron shaped trip strips are spaced from each other such that a "U" shaped passage is formed therebetween and each chevron shaped trip strip has a top portion that curls inwardly towards the channel and a plurality of pairs of features that each extend from a surface of another channel towards each other where a gap is located between distal ends of the plurality of pairs of features.

21 Claims, 21 Drawing Sheets

(58) Field of Classification Search
CPC ....... F05D 2260/2212; F05D 2240/126; F05D 2240/127
See application file for complete search history.

(56) References Cited

U.S. PATENT DOCUMENTS

| | | | | |
|---|---|---|---|---|
| 8,668,453 | B2* | 3/2014 | Lee | F01D 5/187 |
| | | | | 416/96 R |
| 9,388,700 | B2* | 7/2016 | Propheter-Hinckley | |
| | | | | F01D 5/187 |
| 9,777,635 | B2* | 10/2017 | Bergholz | F01D 5/18 |
| 10,280,785 | B2* | 5/2019 | Briggs | F01D 11/24 |
| 10,344,607 | B2* | 7/2019 | Morton | F01D 5/187 |
| 10,358,978 | B2 | 7/2019 | Mongillo et al. | |
| 10,364,684 | B2* | 7/2019 | Allen | F01D 5/188 |
| 10,513,932 | B2 | 12/2019 | Zelesky et al. | |
| 10,563,514 | B2* | 2/2020 | Bunker | F01D 5/145 |
| 10,907,480 | B2 | 2/2021 | Heneveld | |
| 11,339,718 | B2* | 5/2022 | Arisi | F01D 11/08 |
| 2012/0207591 | A1 | 8/2012 | Lee et al. | |
| 2016/0069191 | A1* | 3/2016 | Lutjen | F01D 5/187 |
| | | | | 416/95 |
| 2016/0290139 | A1 | 10/2016 | Snyder et al. | |

FOREIGN PATENT DOCUMENTS

| | | |
|---|---|---|
| JP | 6910607 B2 | 7/2021 |
| WO | 2023275459 A1 | 1/2023 |

* cited by examiner

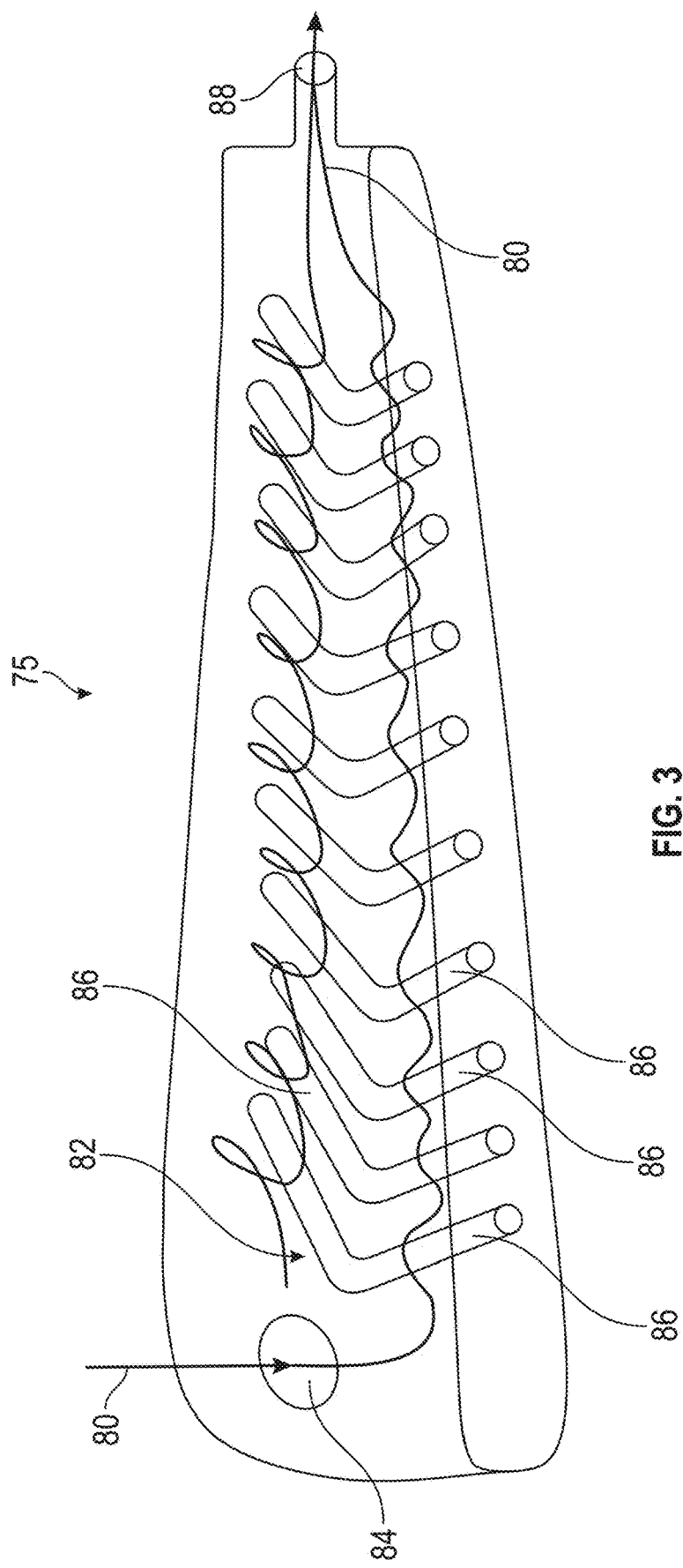

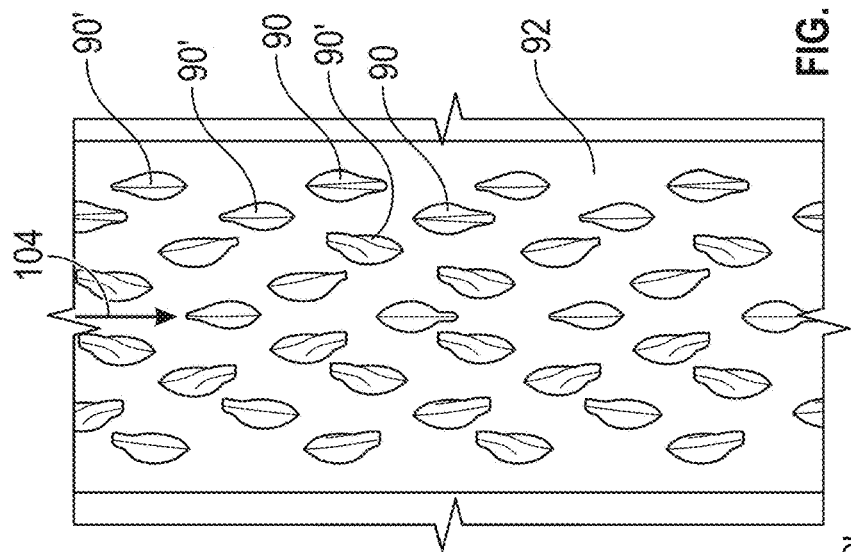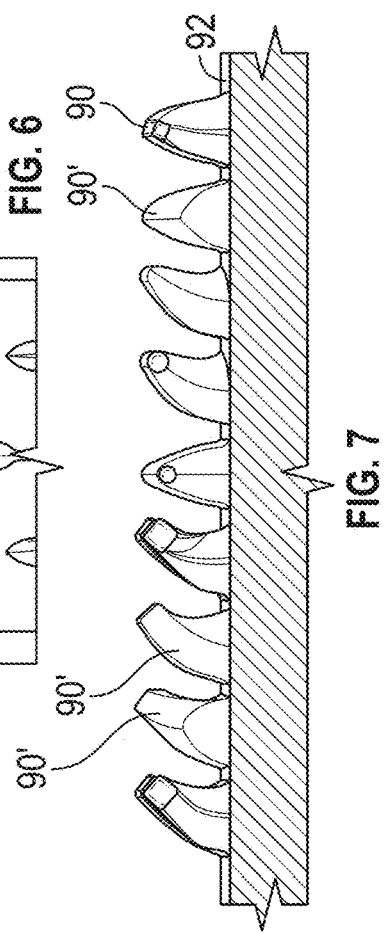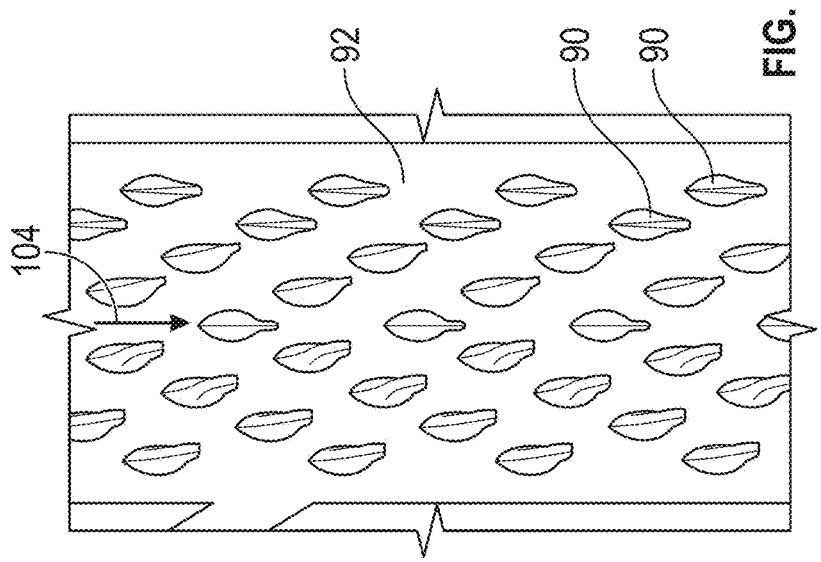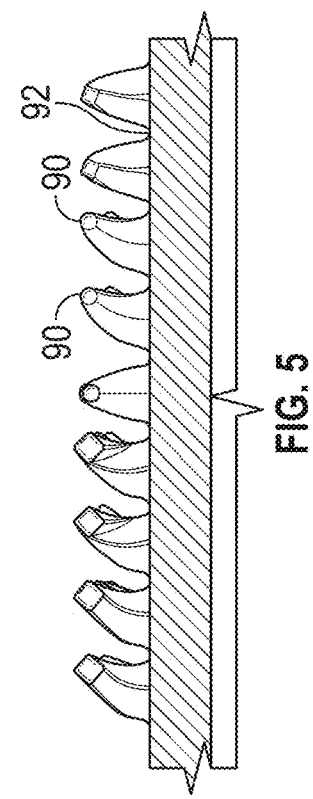

LEAN

+TWIST

LEAN+TWIST

LEAN-TWIST

COOLING FEATURES FOR A COMPONENT OF A GAS TURBINE ENGINE

CROSS REFERENCE TO RELATED APPLICATIONS

This application claims the benefit and priority of U.S. Provisional Application No. 63/415,802 filed Oct. 13, 2022, the entire contents of which are incorporated herein by reference thereto.

BACKGROUND

This disclosure relates to cooling features for a component of gas turbine engine and more particularly, a component of a gas turbine engine with the aforementioned cooling features.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Blade outer air seals (BOAS), vanes, blades and other components are located in hot sections of the gas turbine engine. In some instances these components are cooled with cooling air that passes through an interior cavity of the component. Accordingly, it is desirable to provide a cooled hot section component with features that improves the cooling efficiency.

BRIEF DESCRIPTION

Disclosed is a component for a gas turbine engine, including: at least one internal cavity extending through the component, the internal cavity having at least one inlet opening and at least one outlet opening each being in fluid communication with the at least one internal cavity; a plurality of cooling features extending from a surface of the at least one internal cavity, the plurality of cooling features are formed in accordance with at least one of the following groups: i) a plurality of airfoil shaped features that extend upwardly from the surface of the at least one internal cavity and a plurality of wedge shaped features that extend upwardly from the surface of the at least one internal cavity each of the plurality of wedge shaped features having a triangular base that has an upstream portion and a downstream portion, the upstream portion extending further from the surface than the downstream portion; ii) a plurality features having a curved or "J" shaped base that extends upwardly from the surface of the at least one internal cavity, a plurality features having a double curved or symmetrically "J" shaped base that extends upwardly from the surface of the at least one internal cavity, and a plurality features having a base that extends upwardly from the surface of the at least one internal cavity with a curved portion that defines an opening therethrough; iii) a first plurality of pins with a plurality of grooves that are formed into a peripheral surface of each of the first plurality of pins and a second plurality of pins with a plurality of grooves that are formed into a peripheral surface of each of the plurality of pins, the plurality of grooves formed in the peripheral surface of each of the second plurality of pins are configured such that "V" shapes or inverted "V" shapes are formed in the peripheral surface of each of the second plurality of pins; and iv) a plurality of chevron shaped trip strips that are located in a channel, the plurality of chevron shaped trip strips are spaced from each other such that a "U" shaped passage is formed therebetween and each chevron shaped trip strip of the plurality of chevron shaped trip strips has a top portion that curls inwardly towards the channel and a plurality of pairs of features that each extend from a surface of another channel towards each other where a gap is located between distal ends of the plurality of pairs of features.

In addition to one or more of the features described above, or as an alternative to any of the foregoing embodiments, the component is one of a blade outer air seal, a turbine blade, and vane.

In addition to one or more of the features described above, or as an alternative to any of the foregoing embodiments, each of the plurality of airfoil shaped features of group i include a base portion that extends upwardly away from the surface and the base portion also extends horizontally with respect to the surface such that a tail portion is formed, which creates an undercut portion located underneath the tail portion.

In addition to one or more of the features described above, or as an alternative to any of the foregoing embodiments, a first portion of the plurality of airfoil shaped features are oriented such that the tail portion comprises an upstream end of the first portion of the plurality of airfoil shaped features and a second portion of the plurality of airfoil shaped features are oriented such that the tail portion comprises a downstream end of the second portion of the plurality of airfoil shaped features.

In addition to one or more of the features described above, or as an alternative to any of the foregoing embodiments, a third portion of the plurality of airfoil shaped features has a tail portion that is shifted and/or rotated with respect to a base portion of the third portion of the plurality of airfoil shaped features.

In addition to one or more of the features described above, or as an alternative to any of the foregoing embodiments, each of the plurality of wedge shaped features of group i each have a triangular base that has an upstream portion and a downstream portion, the upstream portion extending further from the surface than the downstream portion and each of the plurality of wedge shaped features of group i have a pair of channels located in side walls of each of the plurality of wedge shaped features of group i and the pair of channels taper downwardly towards the downstream portion.

In addition to one or more of the features described above, or as an alternative to any of the foregoing embodiments, each of the plurality of wedge shaped features of group i each have an undercut portion located at the upstream portion.

In addition to one or more of the features described above, or as an alternative to any of the foregoing embodiments, the plurality features having a curved or "J" shaped base have an undercut portion located below a distal end of the curved or "J" shaped base.

In addition to one or more of the features described above, or as an alternative to any of the foregoing embodiments, the plurality features having a double curved or symmetrically "J" shaped base have an undercut portion located below a distal end of the curved or "J" shaped base.

In addition to one or more of the features described above, or as an alternative to any of the foregoing embodiments, each of the plurality features having the curved portion of group ii have surfaces that are angled inwardly toward each other as they extend from either an upstream end or a downstream end such that a narrow cross section of the base is provided at the opening.

In addition to one or more of the features described above, or as an alternative to any of the foregoing embodiments, each of the plurality features having the curved portion of group ii have a gap may be provided at a top of the curved portion.

In addition to one or more of the features described above, or as an alternative to any of the foregoing embodiments, each of the plurality features having the curved portion of group ii have a width that varies.

In addition to one or more of the features described above, or as an alternative to any of the foregoing embodiments, each of the plurality features having the curved portion of group ii have a width that varies.

In addition to one or more of the features described above, or as an alternative to any of the foregoing embodiments, the plurality of grooves that are formed into the peripheral surface of each of the first plurality of pins are curved so that they twist either clockwise or counter clockwise with respect to a top surface of the first plurality of pins.

In addition to one or more of the features described above, or as an alternative to any of the foregoing embodiments, the component is a blade outer air seal.

In addition to one or more of the features described above, or as an alternative to any of the foregoing embodiments, the plurality of cooling features extending from the surface of the internal cavity are formed in accordance with groups: i and ii.

In addition to one or more of the features described above, or as an alternative to any of the foregoing embodiments, the plurality of cooling features extending from the surface of the internal cavity are formed in accordance with groups: i, ii and iii.

In addition to one or more of the features described above, or as an alternative to any of the foregoing embodiments, the plurality of cooling features extending from the surface of the internal cavity are formed in accordance with groups: i, ii, iii and iv.

In addition to one or more of the features described above, or as an alternative to any of the foregoing embodiments, a plurality of cooling features are located on an upper surface spaced from the surface, the plurality of cooling features located on the upper surface are rounded or circular protrusions that extend from the upper surface.

Also disclosed is a gas turbine engine, including; at least one component configured to receive a cooling air flow, at least one internal cavity extending through the at least one component, the internal cavity having at least one inlet opening and at least one outlet opening each being in fluid communication with the at least one internal cavity; a plurality of cooling features extending from a surface of the internal cavity, the plurality of cooling features are formed in accordance with at least one of the following groups: i) a plurality of airfoil shaped features that extend upwardly from the surface of the at least one internal cavity and a plurality of wedge shaped features that extend upwardly from the surface of the at least one internal cavity, each of the plurality of wedge shaped features having a triangular base that has an upstream portion and a downstream portion, the upstream portion extending further from the surface than the downstream portion; ii) a plurality features having a curved or "J" shaped base that extends upwardly from the surface of the at least one internal cavity, a plurality features having a double curved or symmetrically "J" shaped base that extends upwardly from the surface of the at least one internal cavity, and a plurality features having a base that extends upwardly from the surface of the at least one internal cavity with a curved portion that defines an opening therethrough; iii) a first plurality of pins with a plurality of grooves that are formed into a peripheral surface of each of the first plurality of pins and a second plurality of pins with a plurality of grooves that are formed into a peripheral surface of each of the second plurality of pins the plurality of grooves formed into the peripheral surface of each of the second plurality of pins are configured such that "V" shapes or inverted "V" shapes are formed in the peripheral surface of each of the second plurality of pins; and iv) a plurality of chevron shaped trip strips that are located in a channel, the plurality of chevron shaped trip strips are spaced from each other such that a "U" shaped passage is formed therebetween and each chevron shaped trip strip of the plurality of chevron shapes trip strips has a top portion that curls inwardly towards the channel and a plurality of pairs of features that each extend from a surface of another channel towards each other where a gap is located between distal ends of the plurality of pairs of features.

Also disclosed is a component for a gas turbine engine, including: a plurality of cooling features extending from an exterior surface of the component, the plurality of cooling features are formed in accordance with at least one of the following groups: i) a plurality of airfoil shaped features that extend upwardly from the exterior surface and a plurality of wedge shaped features that extend upwardly from the exterior surface, each of the plurality of wedge shaped features having a triangular base that has an upstream portion and a downstream portion, the upstream portion extending further from the exterior surface than the downstream portion; ii) a plurality features having a curved or "J" shaped base that extends upwardly from the exterior surface, a plurality features having a double curved or symmetrically "J" shaped base that extends upwardly from the exterior surface, and a plurality features having a base that extends upwardly from the exterior surface with a curved portion that defines an opening therethrough; iii) a first plurality of pins with a plurality of grooves that are formed into a peripheral surface of each of the first plurality of pins and a second plurality of pins with a plurality of grooves that are formed into a peripheral surface of each of the second plurality of pins the plurality of grooves formed into the peripheral surface of each of the second plurality of pins are configured such that "V" shapes or inverted "V" shapes are formed in the peripheral surface of each of the second plurality of pins; and iv) a plurality of chevron shaped trip strips that are located in a channel, the plurality of chevron shaped trip strips are spaced from each other such that a "U" shaped passage is formed therebetween and each chevron shaped trip strip of the plurality of chevron trip strips has a top portion that curls inwardly towards the channel and a plurality of pairs of features that each extend from a surface of another channel towards each other where a gap is located between distal ends of the plurality of pairs of features.

BRIEF DESCRIPTION OF THE DRAWINGS

The following descriptions should not be considered limiting in any way. With reference to the accompanying drawings, like elements are numbered alike:

FIG. 3 is a schematic view of a blade outer air seal for use in a gas turbine engine;

FIGS. 4-13 illustrate cooling features in accordance with one embodiment of the present disclosure;

DETAILED DESCRIPTION

A detailed description of one or more embodiments of the disclosed apparatus and method are presented herein by way of exemplification and not limitation with reference to the FIGS.

Figure 1:
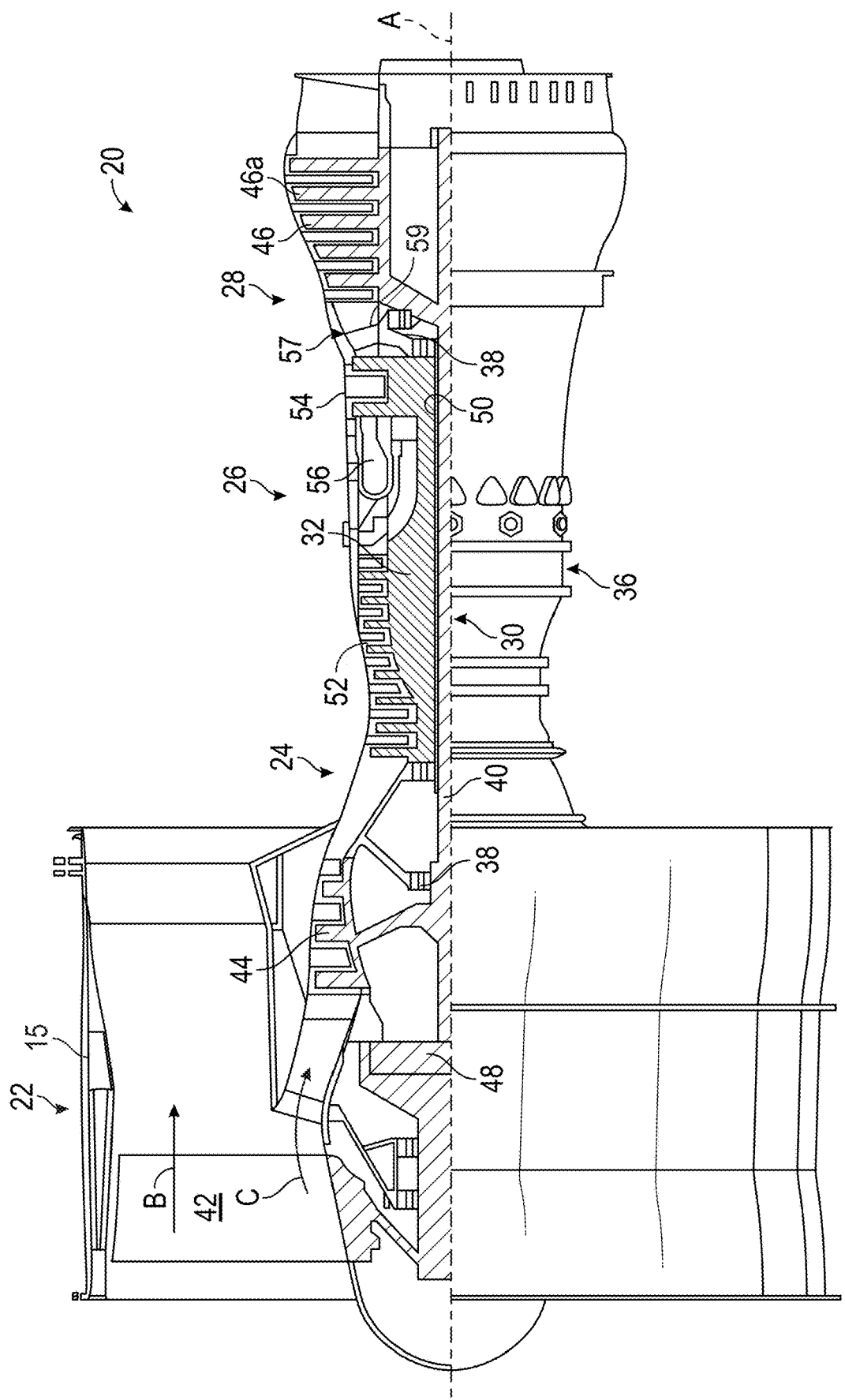
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path Cl for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram} \,°\, R)/(518.7° R)]^{0.5}$. The "Low corrected fan tip speed" as disclosed herein according to one non-limiting embodiment is less than about 1150 ft/second (350.5 m/sec).

In a further example, the fan 42 includes less than about 26 fan blades. In another non-limiting embodiment, the fan 42 includes less than about 20 fan blades. Moreover, in one further embodiment the low pressure turbine 46 includes no more than about 6 turbine rotors schematically indicated at 46a. In a further non-limiting example the low pressure turbine 46 includes about 3 turbine rotors. A ratio between the number of blades of the fan 42 and the number of low pressure turbine rotors 46a is between about 3.3 and about 8.6. The example low pressure turbine 46 provides the driving power to rotate the fan section 22 and therefore the relationship between the number of turbine rotors 46a in the low pressure turbine 46 and the number of blades in the fan section 22 discloses an example gas turbine engine 20 with increased power transfer efficiency.

Figure 2:
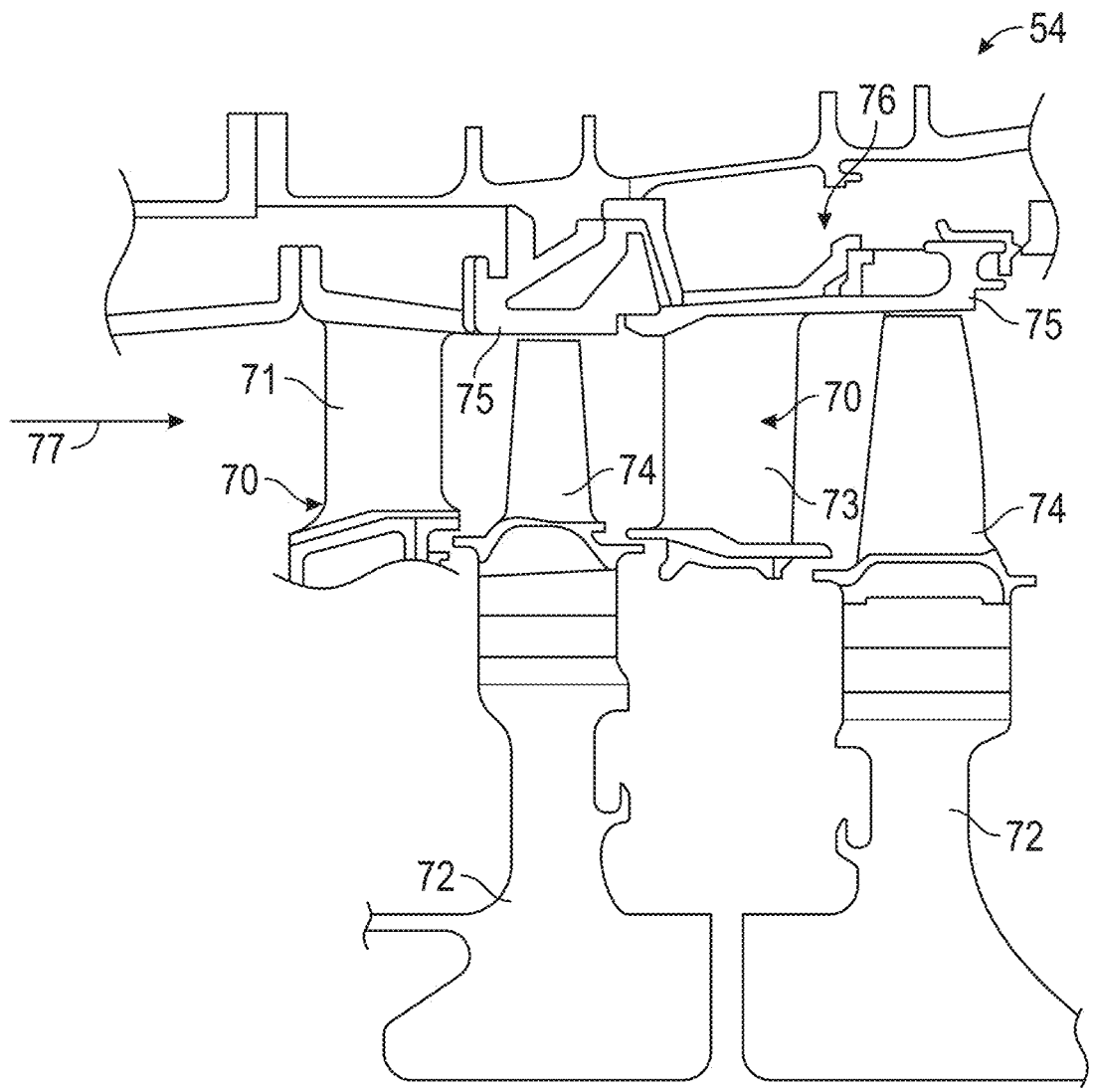
FIG. 2 is a schematic view of a two-stage high pressure turbine of the gas turbine engine.

FIG. 2 illustrates a portion of the high pressure turbine (HPT) 54. FIG. 2 also illustrates a high pressure turbine stage vanes 70 one of which (e.g., a first stage vane 71) is located forward of a first one of a pair of turbine disks 72 each having a plurality of turbine blades 74 secured thereto. The turbine blades 74 rotate proximate to blade outer air seals (BOAS) 75 which are located aft of the first stage vane 71. The other vane 70 is located between the pair of turbine disks 72. This vane 70 may be referred to as the second stage vane 73. As used herein the first stage vane 71 is the first vane of the high pressure turbine section 54 that is located aft of the combustor section 26 and the second stage vane 73 is located aft of the first stage vane 71 and is located between the pair of turbine disks 72. In addition, blade outer air seals (BOAS) 75 are disposed between the first stage vane 71 and the second stage vane 73. The high pressure turbine stage vanes 70 (e.g., first stage vane 71 or second stage vane 73) are one of a plurality of vanes 70 that are positioned circumferentially about the axis A of the engine in order to provide a stator assembly 76. Hot gases from the combustor section 26 flow through the turbine in the direction of arrow 77. Although a two-stage high pressure turbine is illustrated other high pressure turbines are considered to be within the scope of various embodiments of the present disclosure.

The high pressure turbine (HPT) is subjected to gas temperatures well above the yield capability of its material. In order to mitigate such high temperature detrimental effects, a supply of cooling air is applied to an internal cavity of components located in the hot sections of the gas turbine engine. This cooling air may also be used for surface film-cooling by supplying the cooling air through cooling holes drilled on the components.

FIG. 3 schematically illustrates a blade outer air seal (BOAS) 75. Cooling air flow is illustrated by arrows 80 that is introduced into a cavity or channel 82 of the blade outer air seal 75 via at least one inlet opening 84. The cooling air flow is directed through the channels 82 that extend internally in the blade outer air seal 75. The channels 82 are provided with trip strips 86. These trip strips 86 can be generally referred to as protrusions or cooling features that extend from a surface of the channel. The trip strips create turbulences in the cooling air flow which enhances convection. The channel 82 is in fluid communication with the at least one inlet opening 84 and at least one outlet opening 88. The cooling air exiting the at least one outlet opening 88 may be used for surface film cooling. The at least one outlet opening 88 may be located away from the at least one inlet opening 84 such that maximum cooling efficiently can be achieved internally before the cooling air exits the channel 82 via the at least one outlet opening 88. However prior manufacturing techniques have limited the size and detail in which the trip strips 86 can be produced.

In accordance with the present disclosure and by using tomographic layering technology, internal features of the components have be refined to manipulate the cooling airflow and improve heat transfer from trip strips 86. For example, a three dimensional 3D digital model is transformed into a series of lithographic masks. Each mask representing a cross-sectional slice of a desired 3D solid. Each mask is then used to photochemically machine a replica from metal foil or polymeric film. Then the foil or films are stack-laminated to create a master mold. Then, production molds are then derived from the master mold. Then, the desired material is cast into or around the production mold to product the part.

In other words, lithographic etching and assembly are combined with computerized numerical control (CNC) machining to produce tools and/or cores with highly complex three-dimensional features. Afterwards a molding and casting process is then used with the cores to produce parts. See also U.S. Pat. No. 8,598,553.

For example and referring now to at least FIGS. 4-13 cooling features 90 in accordance with one embodiment of the present disclosure are illustrated. As illustrated in at least FIGS. 4-7, a portion of an interior cavity of a component of the gas turbine engine is illustrated. The component may be any component that requires cooling including but not limited to any one of the following: blade outer air seals (BOAS), vanes, blades and other components that are required to be cooled by a source of cooling air.

Figure 8:
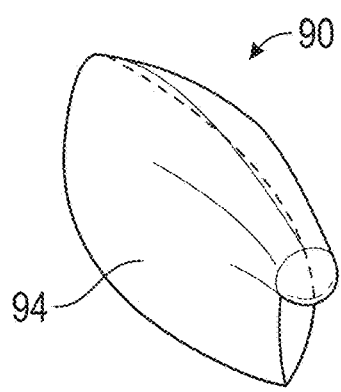
Figure 9:
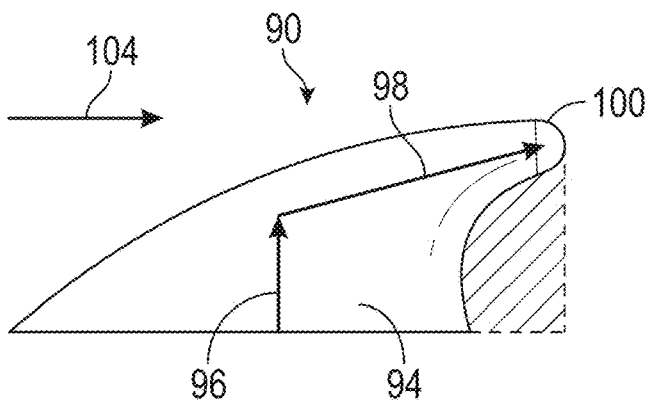
Figure 10:
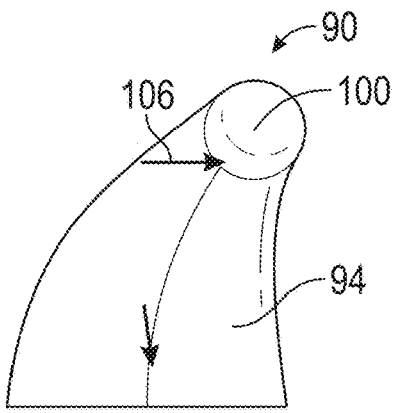
Figure 11:
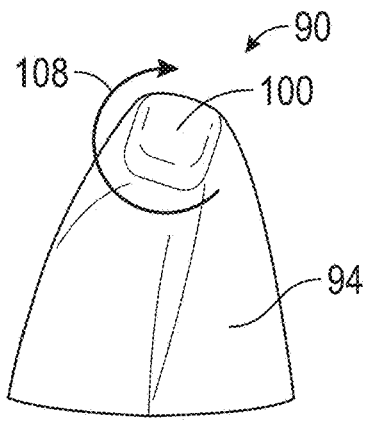

In this embodiment and as illustrated in at least FIGS. 8 and 9, the cooling features 90 may comprise a plurality of symmetrically airfoil shaped features that extend upwardly of a surface 92 of a channel extending through a component of the gas turbine engine. Each feature includes a base portion 94 that extends upwardly in the direction of arrow 96 away from the surface 92. In addition, the base portion 94 also extends horizontally with respect to the surface (as illustrated by arrow) 98 such that an extension or tail portion 100 is formed. This also creates an undercut portion 102 located underneath the extension or tail portion 100. As air flows in the direction of arrow 104 with respect to the cooling feature 90 vortices are formed such that enhanced cooling is provided by the plurality of features 90.

In an alternative arrangement, the feature 90 can be oriented 180 degrees with respect to the view illustrated in FIG. 9 such that the extension or tail portion 100 can be upstream or facing the air flow. This is illustrated by features 90' in at least FIGS. 6 and 7. Again, air turbulence and enhanced cooling is provided by the plurality of features 90'.

As illustrated in at least FIGS. 8 and 9, the extension or tail portion 100 is generally aligned with the base portion 94. Referring now to at least FIG. 10, the extension or tail 100 may be shifted in the direction of arrow 106 with respect to the base portion 94. Referring now to at least FIG. 11, the extension or tail 100 may be twisted or rotated in the direction of arrow 108 with respect to the base portion 94. Again, air turbulence and enhanced cooling is provided by these features 90.

Figure 12:
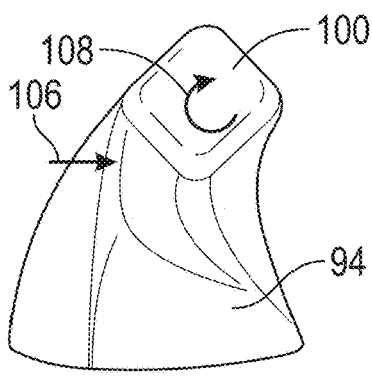

Referring now to at least FIG. 12, the extension or tail 100 may be shifted in the direction of arrow 106 with respect to the base portion 94 and the extension or tail 100 may be twisted or rotated in the direction of arrow 108 with respect to the base portion 94. Again, air turbulence and enhanced cooling is provided by these features 90.

Figure 13:
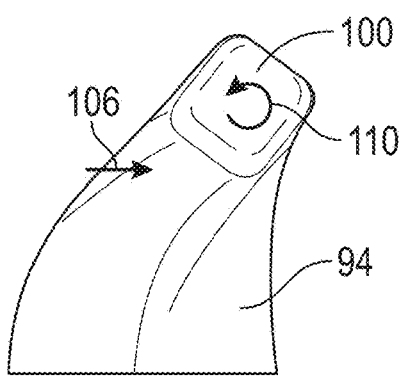
Figure 14:
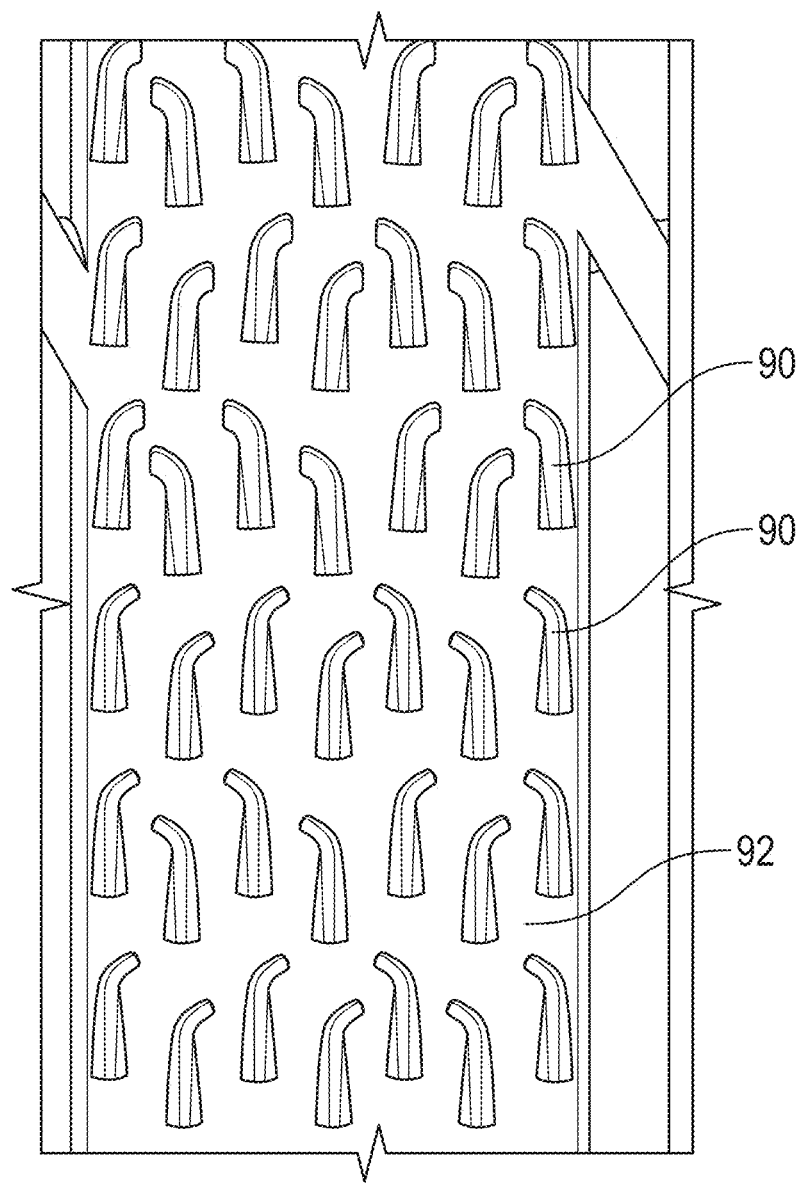
FIGS. 14-19 illustrate cooling features in accordance with another embodiment of the present disclosure.
Figure 15:
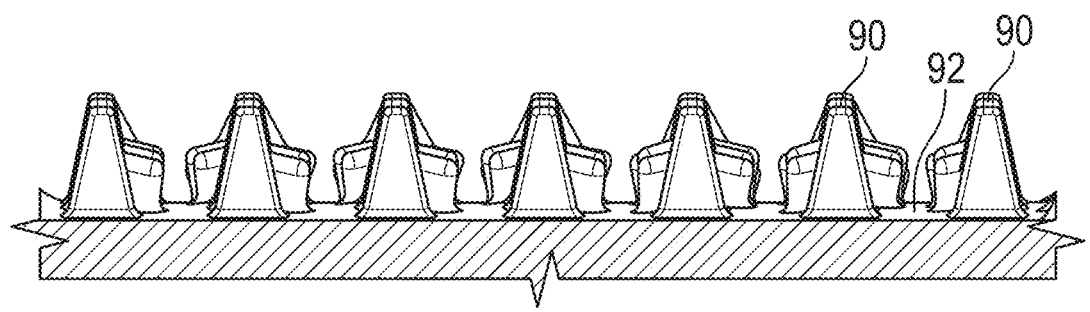
Figure 17:
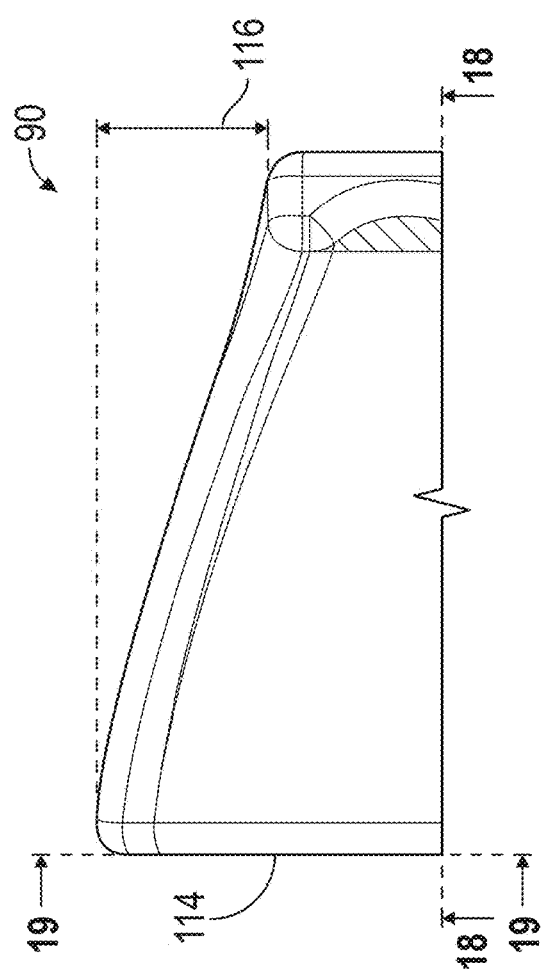
Figure 19:
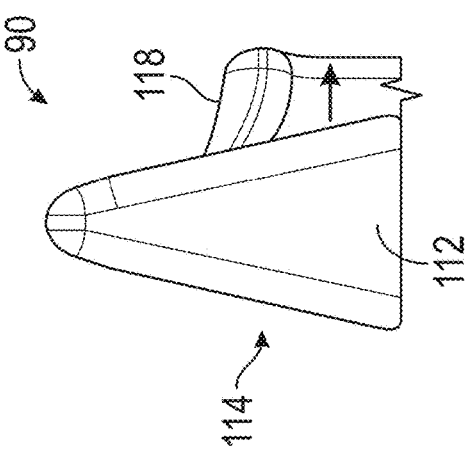
Figure 16:
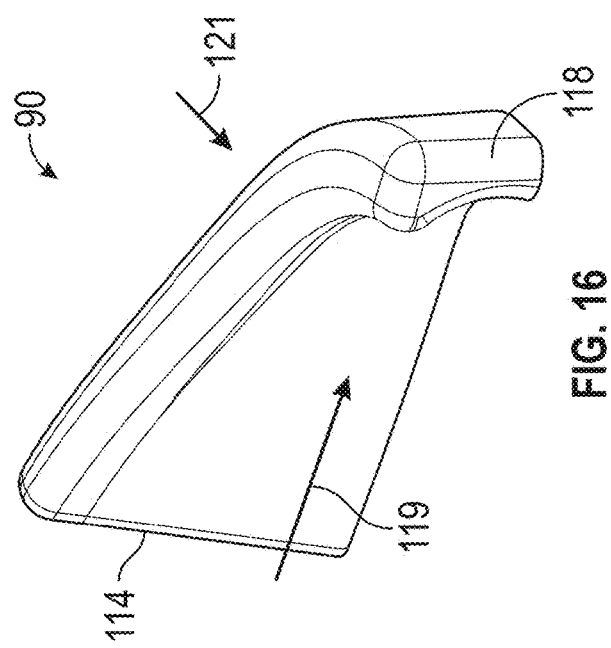
Figure 18:
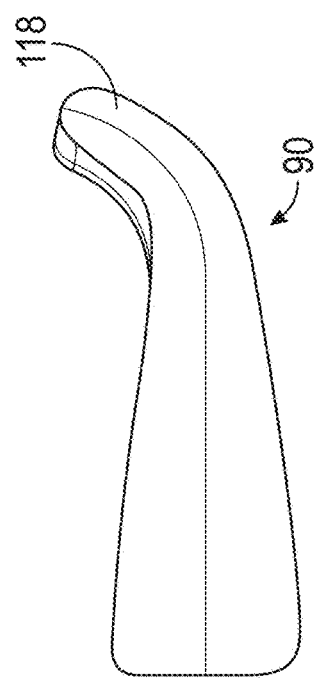

Referring now to at least FIG. 13, the extension or tail 100 may be shifted in the direction of arrow 106 with respect to the base portion 94 and the extension or tail 100 may be twisted or rotated in the direction of arrow 110 with respect to the base portion 94. The direction of arrow 110 being generally opposite in the direction of arrow 106. Again, air turbulence and enhanced cooling is provided by these features 90.

FIGS. 4 and 5 illustrate various configuration of the features 90 mentioned above extending from the surface 92 of an interior channel of the component where the extension or tail 100 is downstream from the direction of the cooling airflow. Again, air turbulence and enhanced cooling is provided by these features 90.

FIGS. 6 and 7 illustrate various configuration of the features 90 mentioned above extending from the surface 92 of an interior channel of the component where the extension or tail 100 is either downstream or facing upstream with respect to the direction of the cooling airflow. Again, air turbulence and enhanced cooling is provided by these features 90.

For example and referring now to at least FIGS. 14-19, cooling features 90 in accordance with another embodiment of the present disclosure are illustrated. As illustrated in at least FIGS. 14 and 15, a portion of an interior cavity of component of the gas turbine engine is illustrated. The component may be any component that requires cooling including but not limited to any one of the following: blade outer air seals (BOAS), vanes, blades and other components that are required to be cooled by a source of cooling air.

In this embodiment, the cooling features 90 may comprise a plurality features having a curved or "J" shaped base that extends upwardly from the surface 92 of a channel extending through a component of the gas turbine engine. In this embodiment, each feature includes an upstream section that has a triangularly shaped base portion 112. In other words, a width of the triangularly shape base portion 112 decreased as it extends away from the surface 92. In addition, a height of the feature 90 also decreases as it extends laterally from an upstream end or forward end 114 of the feature 90. This is illustrated by arrows 116. In addition, a downstream end or distal end 118 of the feature curls toward a direction 119 of the airflow in the direction of arrow 121. This also results in an undercut portion 122 being located below the distal end 118 of the feature 90. As air flows in the direction of arrow 119 with respect to the cooling feature 90 vortices are formed such that enhanced cooling is provided by the plurality of features 90.

Referring now to at least FIGS. 20-27 cooling features 90 in accordance with yet another embodiment of the present disclosure are illustrated. As illustrated in at least FIGS. 20 and 21, a portion of an interior cavity of component of the gas turbine engine is illustrated. The component may be any component that requires cooling including but not limited to any one of the following: blade outer air seals (BOAS), vanes, blades and other components that are required to be cooled by a source of cooling air.

In this embodiment, the cooling features 90 may comprise a plurality features having a double curved or symmetrically "J" shaped base that extends upwardly from the surface 92 of a channel extending through a component of the gas turbine engine. In this embodiment, each feature 90 includes an upstream section that has a triangularly shaped base portion 120. In other words, a width of the triangularly shape base portion 120 decreased as it extends away from the surface 92. In addition, a height of the feature 90 also decreases as it extends laterally from an upstream end or forward end 114 of the feature 90. This is illustrated by arrows 116. In addition, the downstream ends or distal ends 118 of the feature curls toward a direction 119 of the airflow in the direction of arrows 121. This also results in undercut portions 122 being located below the distal ends 118 of the feature 90. As air flows in the direction of arrow 119 with respect to the cooling feature 90 vortices are formed such that enhanced cooling is provided by the plurality of features 90.

Figure 20:
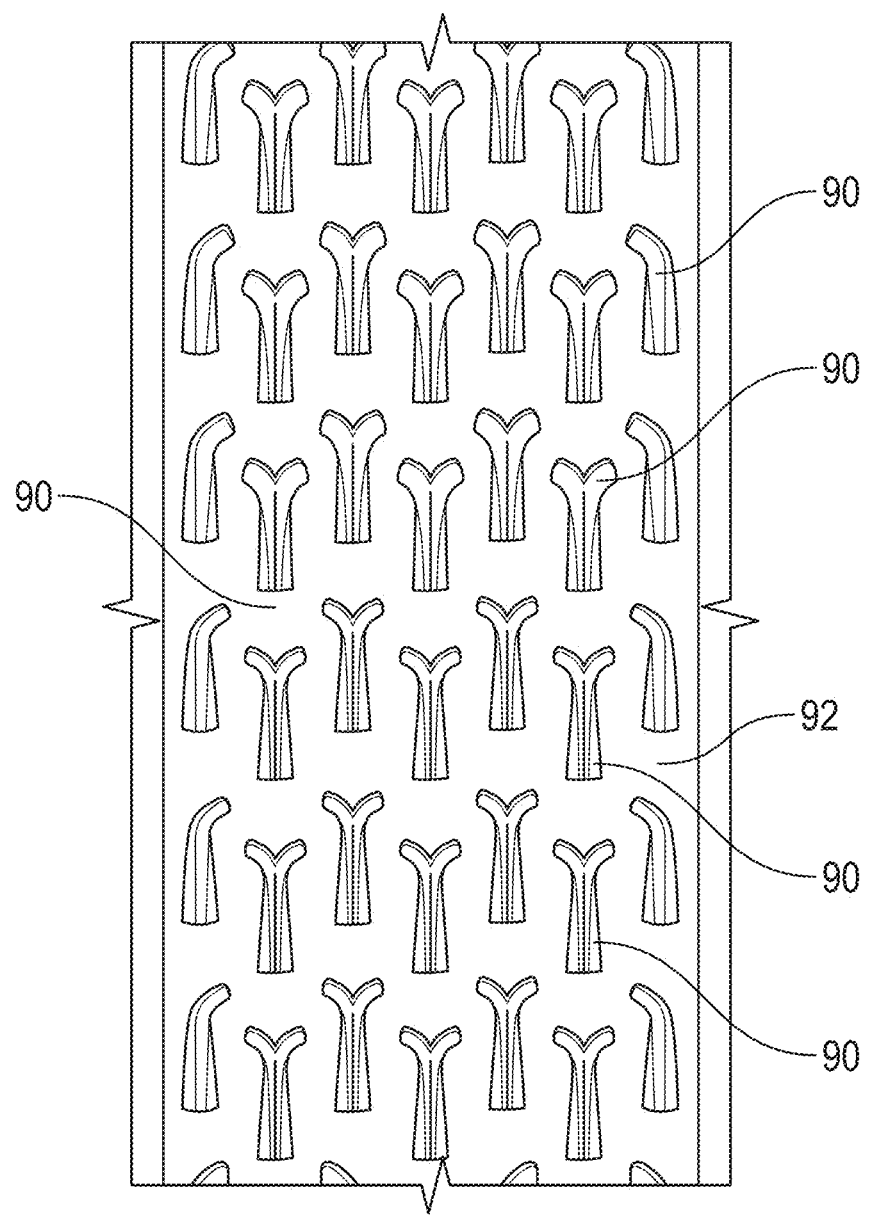
FIGS. 20-27 illustrate cooling features in accordance with yet another embodiment of the present disclosure.
Figure 21:
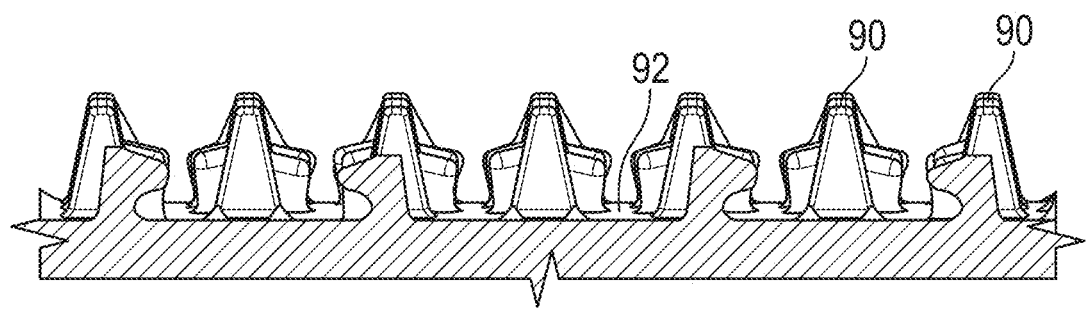
Figure 22:
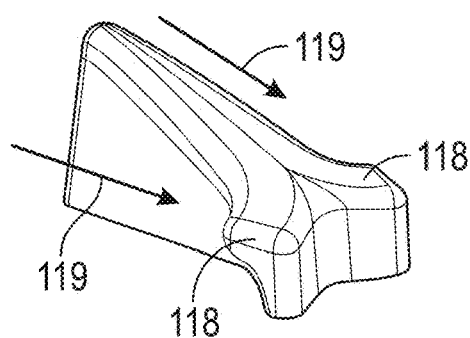
Figure 23:
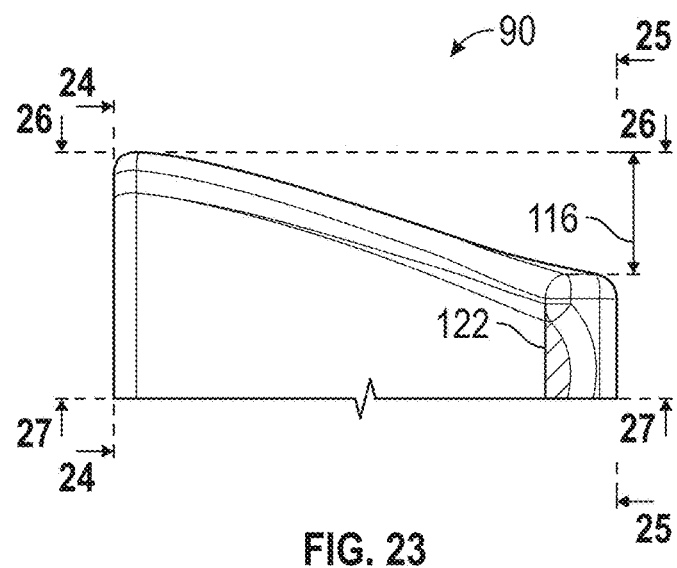
Figure 24:
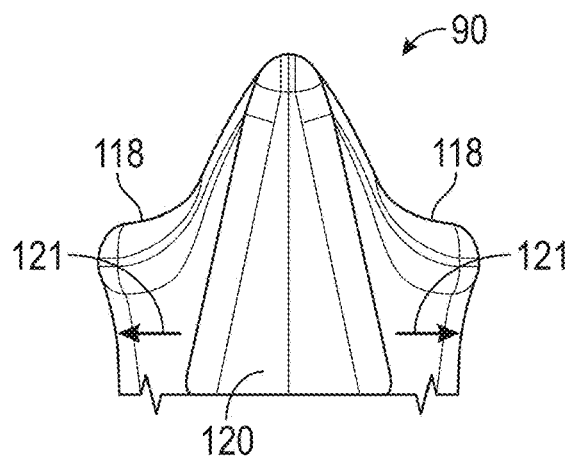
Figure 25:
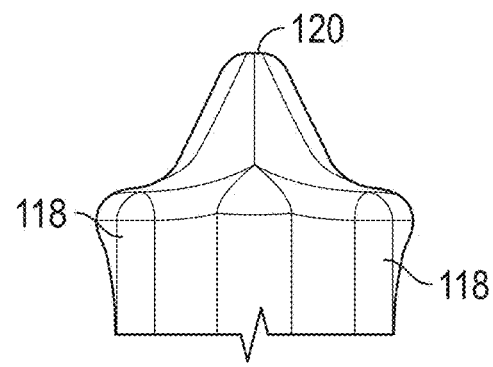
Figure 26:
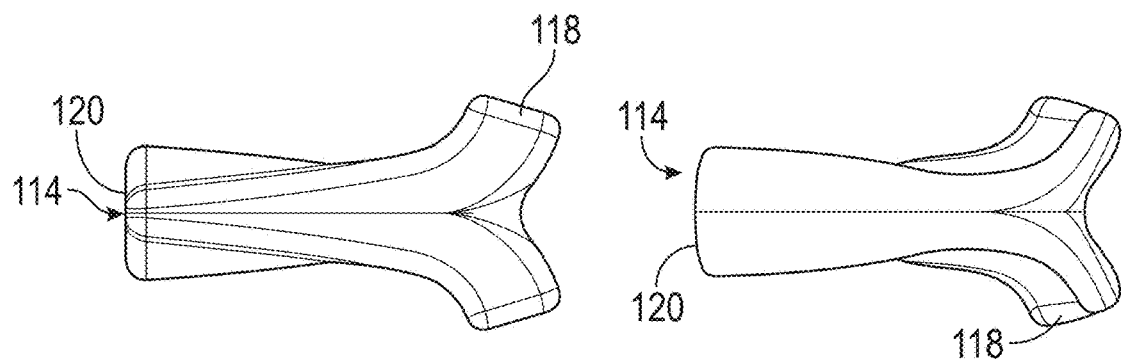
Figure 27:
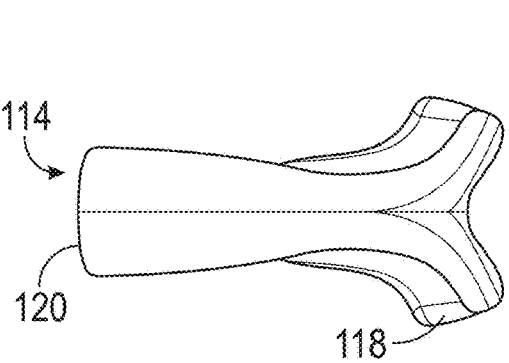
Figure 28:
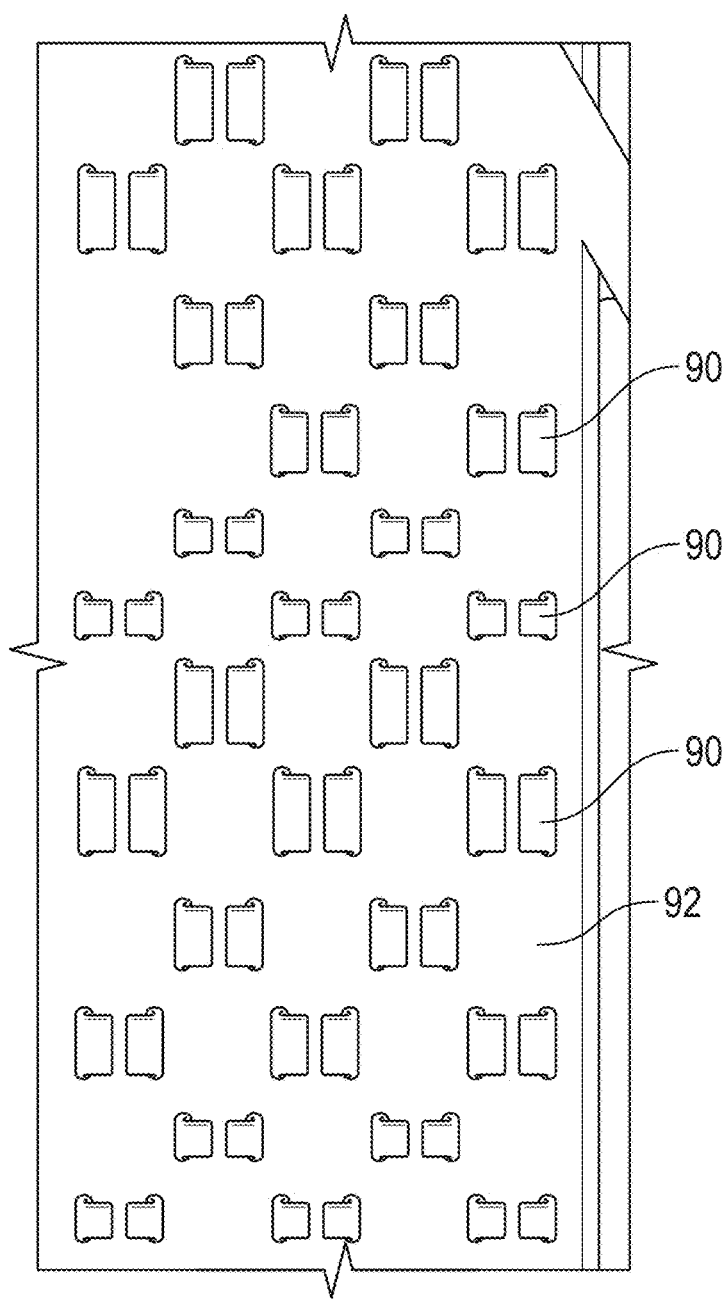
FIGS. 28-35 illustrate cooling features in accordance with another embodiment of the present disclosure.
Figure 29:
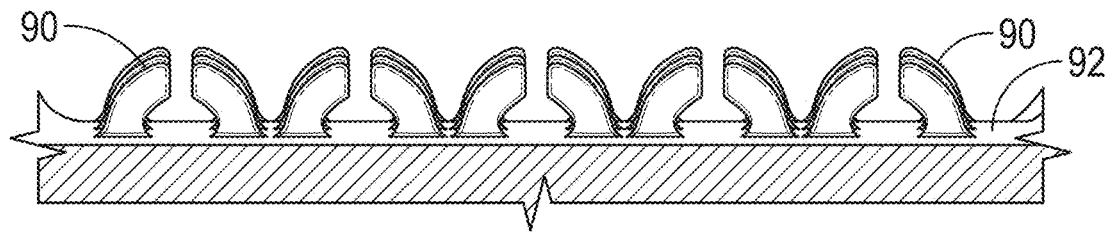
Figure 30:
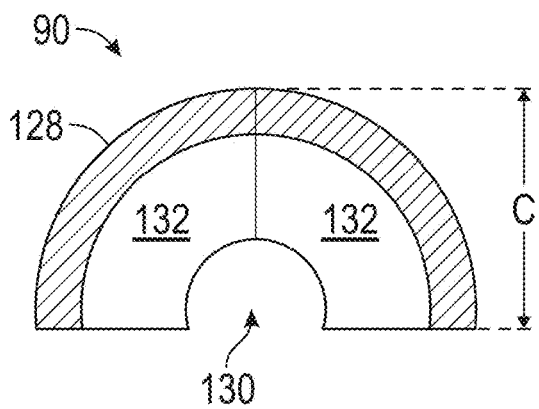
Figure 31:
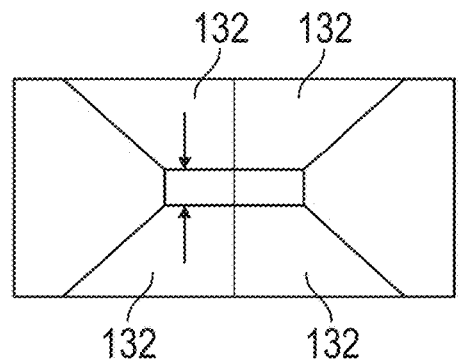
Figure 32:
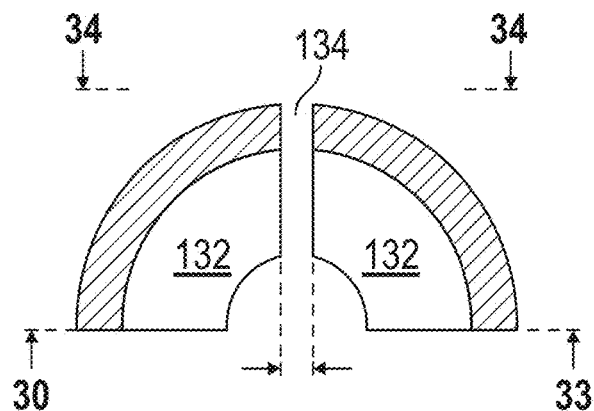

FIGS. 20 and 21 illustrate that combinations of the features 90 illustrated in FIGS. 16-19 and FIGS. 23-27 extending from the surface 92 of an interior channel of the component where the extension or tail 100 is either extending from one or both sides of the distal end 118 of the feature 90. Again, air turbulence and enhanced cooling is provided by these features 90.

Referring now to at least FIGS. 28-35, cooling features 90 in accordance with another embodiment of the present disclosure are illustrated. As illustrated in at least FIGS. 28 and 29, a portion of an interior cavity of component of the gas turbine engine is illustrated. The component may be any component that requires cooling including but not limited to any one of the following: blade outer air seals (BOAS), vanes, blades and other components that are required to be cooled by a source of cooling air.

In this embodiment, the cooling features 90 may comprise a plurality features having a base that extends upwardly from the surface 92 of a channel extending through a component of the gas turbine engine. In this embodiment, each feature includes a curved portion 128 that defines an opening 130 therethrough. The opening 130 allowing airflow to pass therethrough. The base portion 94 of this embodiment has surfaces 132 that are angled inwardly toward each other as they extend from either an upstream end or a downstream end of the feature 90 such that a narrow cross section of the base portion 94 is provided at the opening 130 as compared to other areas of the base portion 94. This configuration will result in a converging/diverging passageway as cooling airflow passes through opening 130. This will create enhanced turbulence that will improve cooling. While these features are illustrated as being symmetric it is contemplated that in another embodiment they could be offset one another as a body or in flow-wise placement of a minimum radius of the opening 130.

Figure 33:
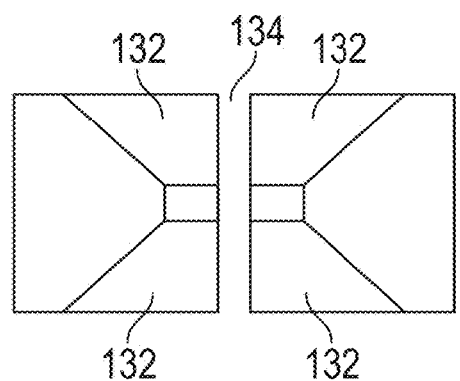
Figure 34:
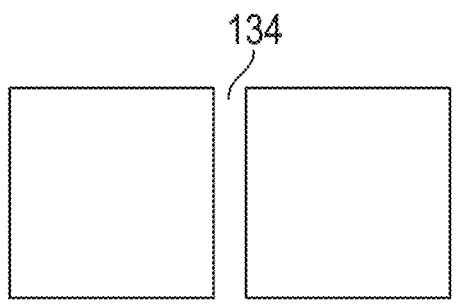
Figure 35:
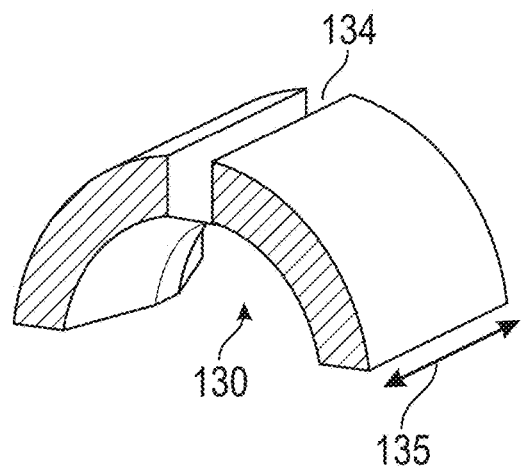

Referring now to FIGS. 33-35, a gap 134 may be provided at the top of the feature. The gap 134 may assist in manufacturability of the features 90 of this embodiment. A width 135 of the base of the cooling feature 90 illustrated in at least FIGS. 28-35 may vary. This is illustrated in at least FIG. 35. Again, air turbulence and enhanced cooling is provided by these features 90.

Figure 36:
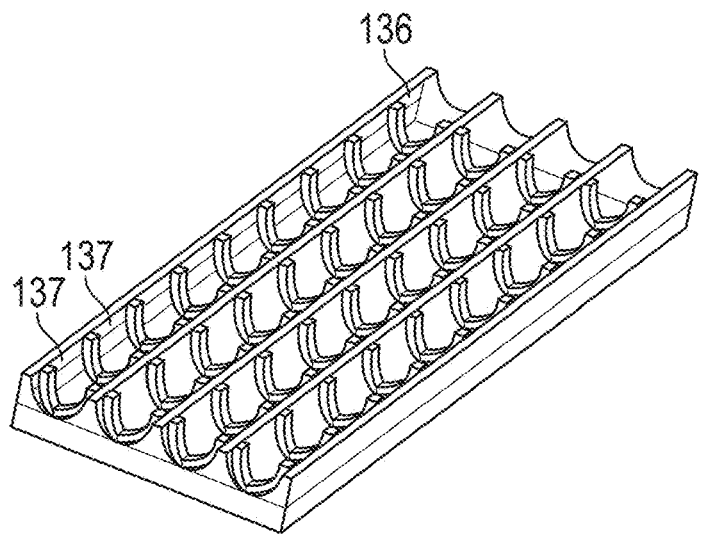
FIGS. 36-38 illustrate cooling features in accordance with yet another embodiment of the present disclosure.
Figure 37:
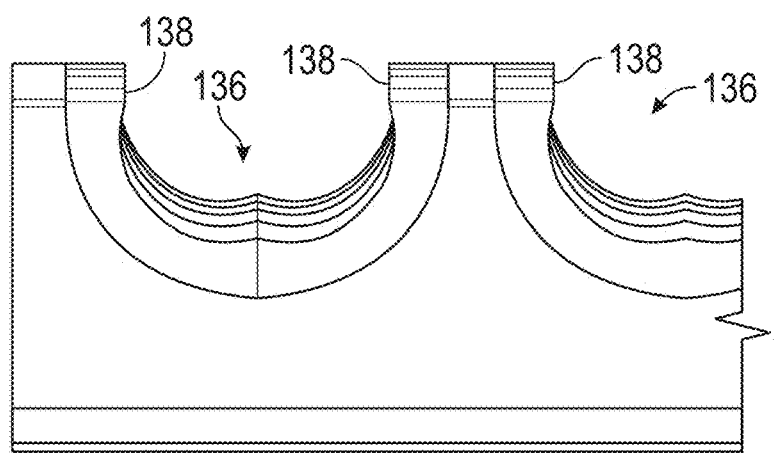
Figure 38:
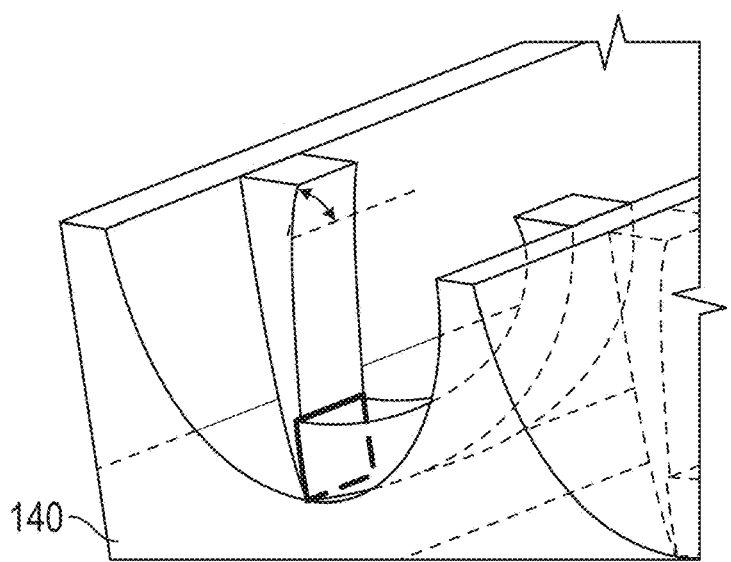

Referring now to at least FIGS. 36-38 cooling features 90 in accordance with yet another embodiment of the present disclosure are illustrated. As illustrated in at least FIG. 36, a portion of an interior cavity of component of the gas turbine engine is illustrated. The component may be any component that requires cooling including but not limited to any one of the following: blade outer air seals (BOAS), vanes, blades and other components that are required to be cooled by a source of cooling air.

In this embodiment, the cooling features 90 may comprise a chevron shaped trip strips that are located in a channel 136. The chevron shaped trip strips are spaced from each other such that a "U" shaped passage 137 is formed therebetween and each chevron shaped trip strip has a top portion 138 that curls inwardly towards the channel 136. In addition, a cross-sectional area 140 of each chevron shaped trip strip may vary to include shapes such as square, rectangle, triangle or any other suitable configuration.

Figure 39:
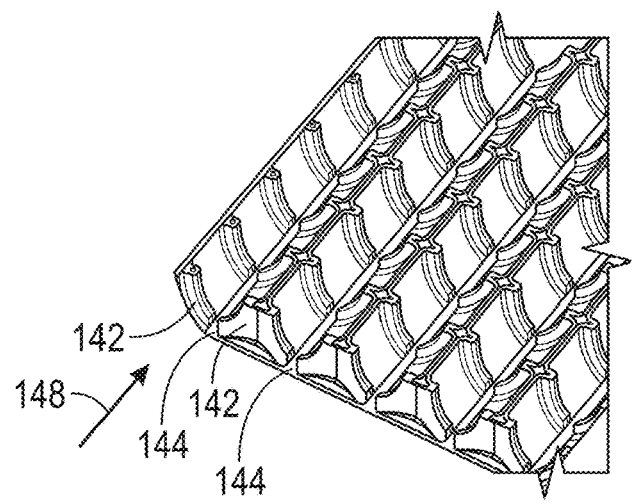
FIGS. 39-41 illustrate cooling features in accordance with yet another embodiment of the present disclosure.
Figure 40:
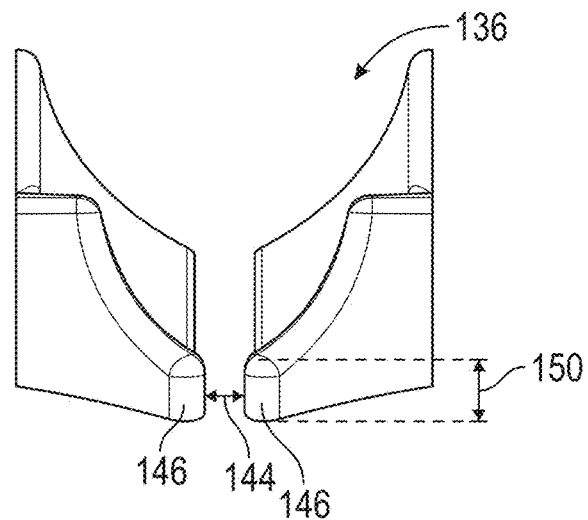
Figure 41:
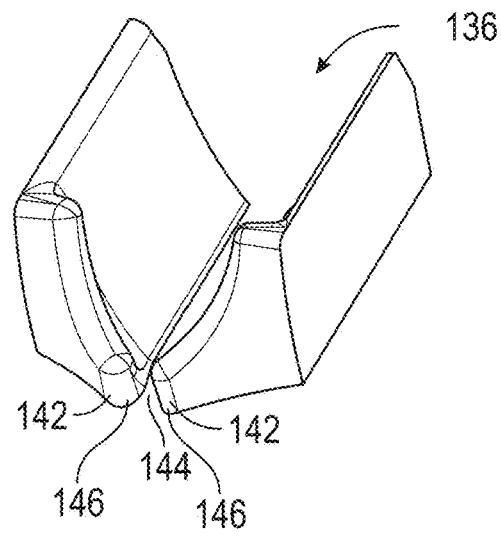
Figure 42:
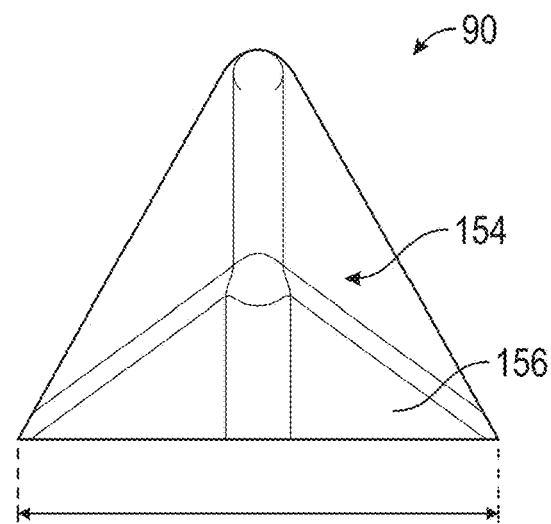
FIGS. 42-46 illustrate cooling features in accordance with yet another embodiment of the present disclosure.
Figure 43:
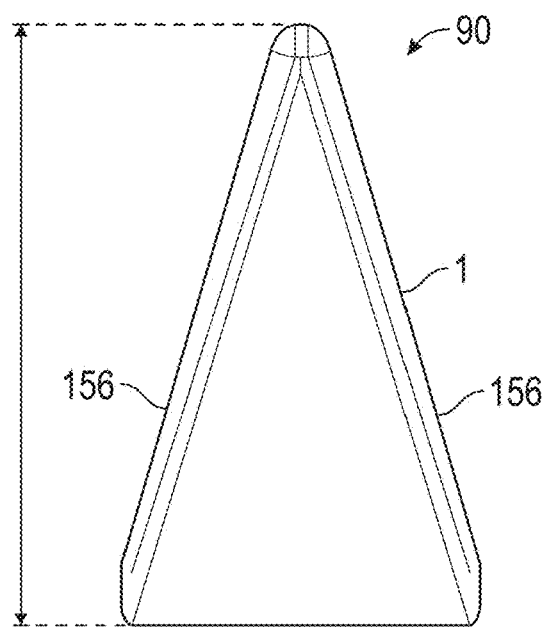
Figure 44:
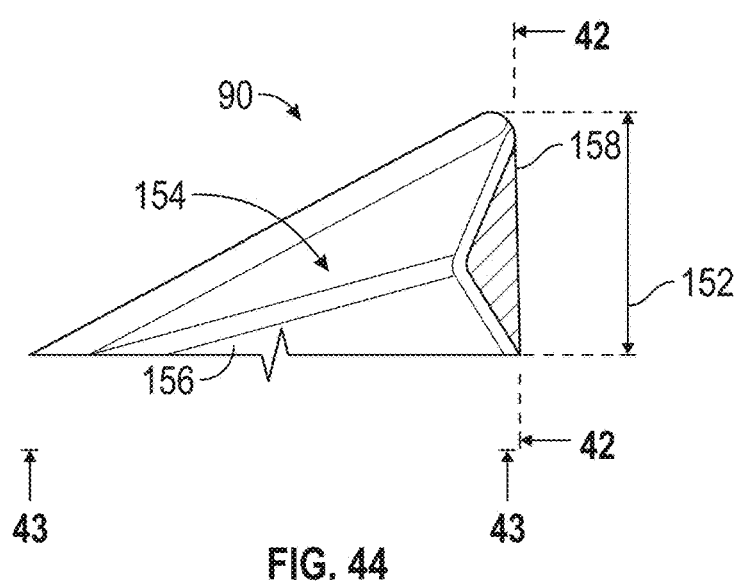
Figure 45:
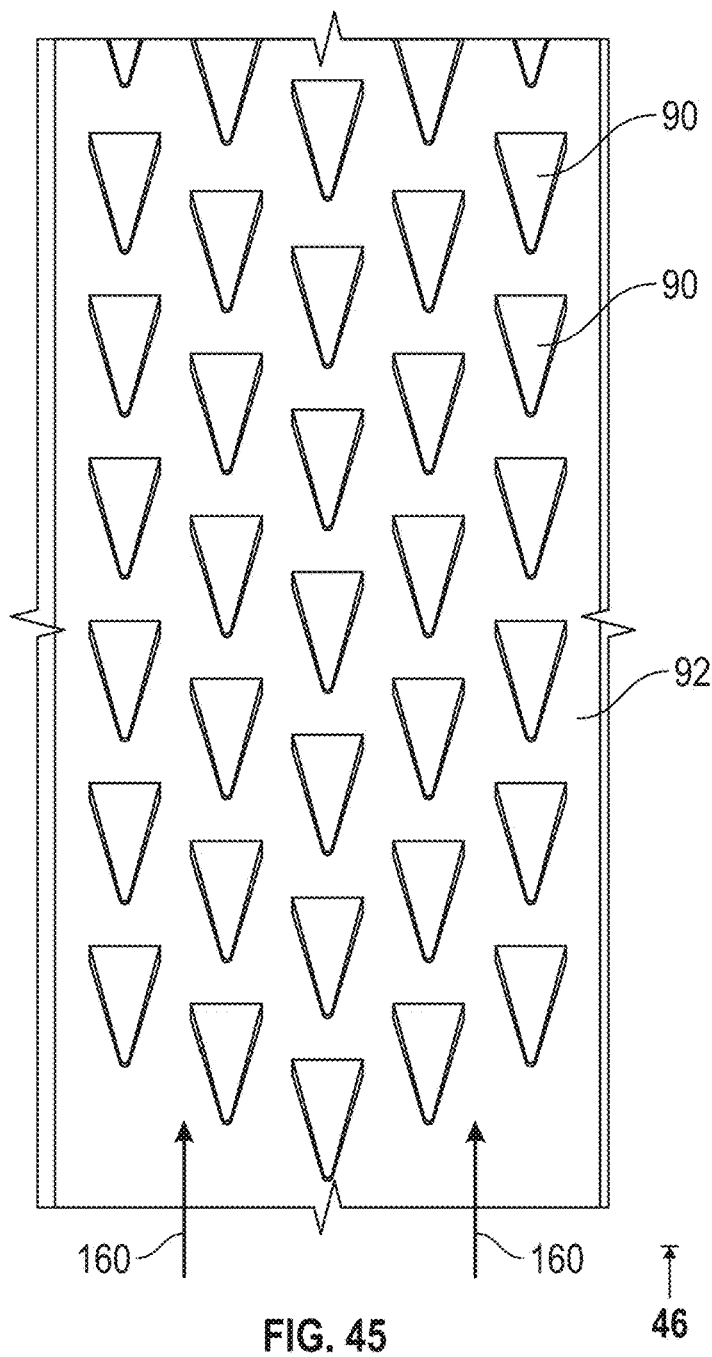
Figure 46:
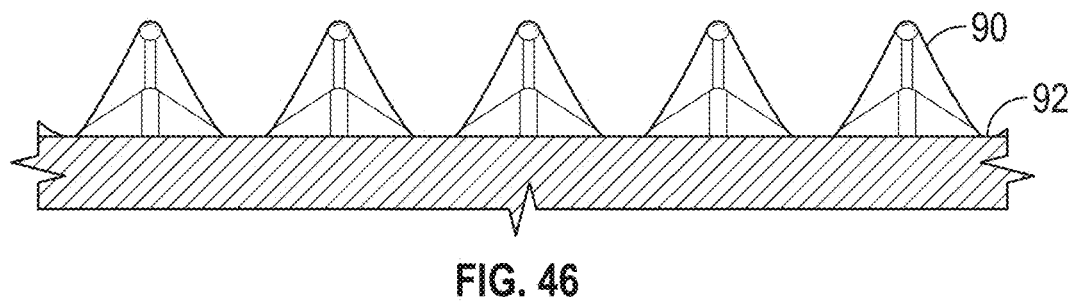
Figure 47:
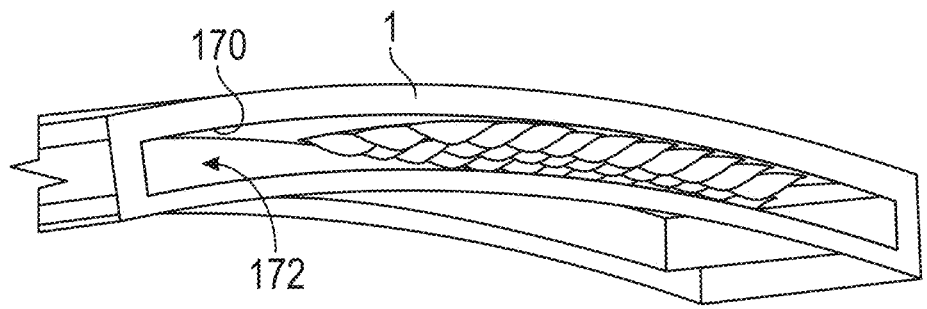
FIGS. 47-51 illustrate cooling features in accordance with yet another embodiment of the present disclosure.
Figure 48:
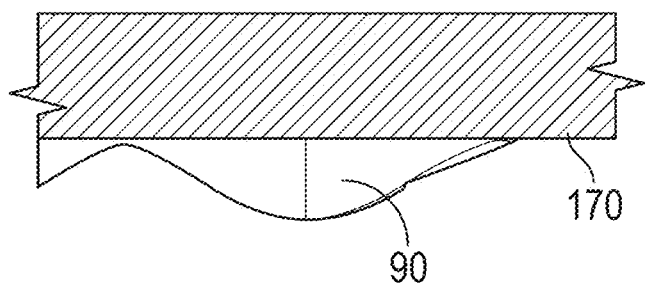
Figure 49:
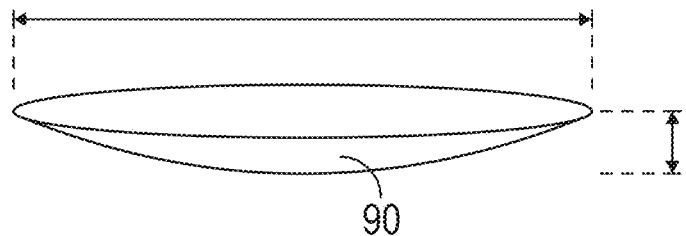
Figure 50:
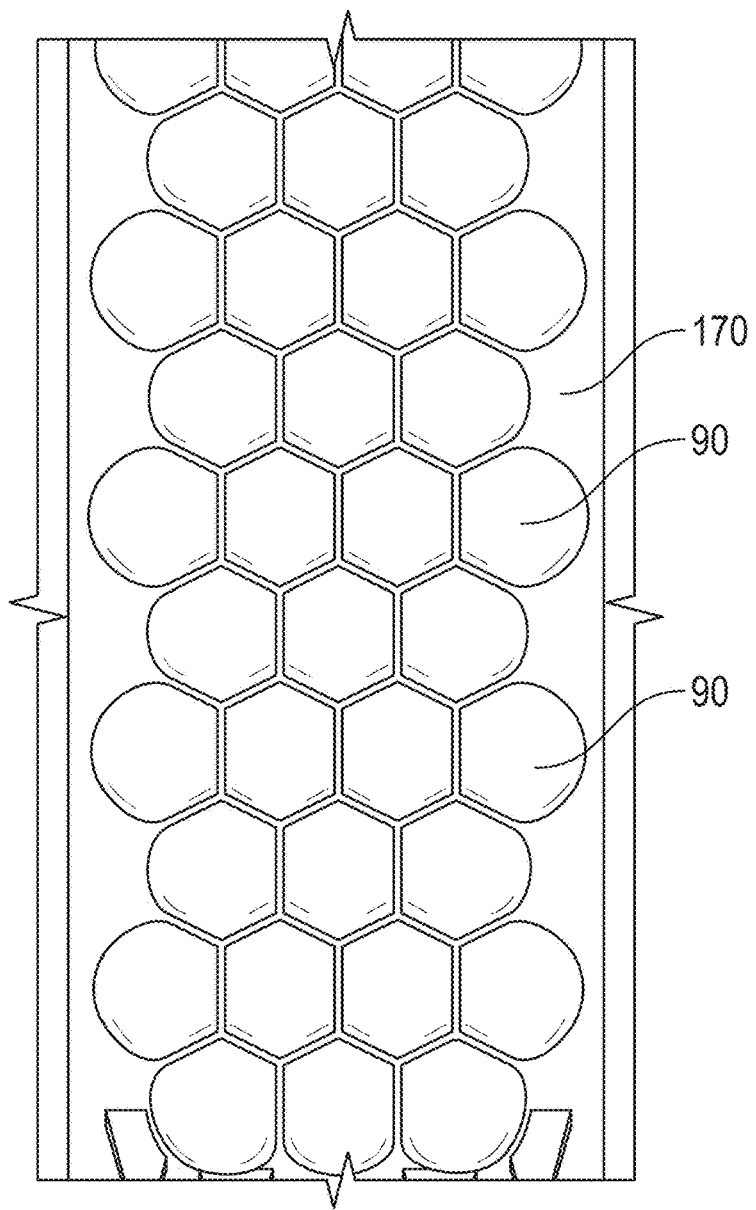
Figure 51:
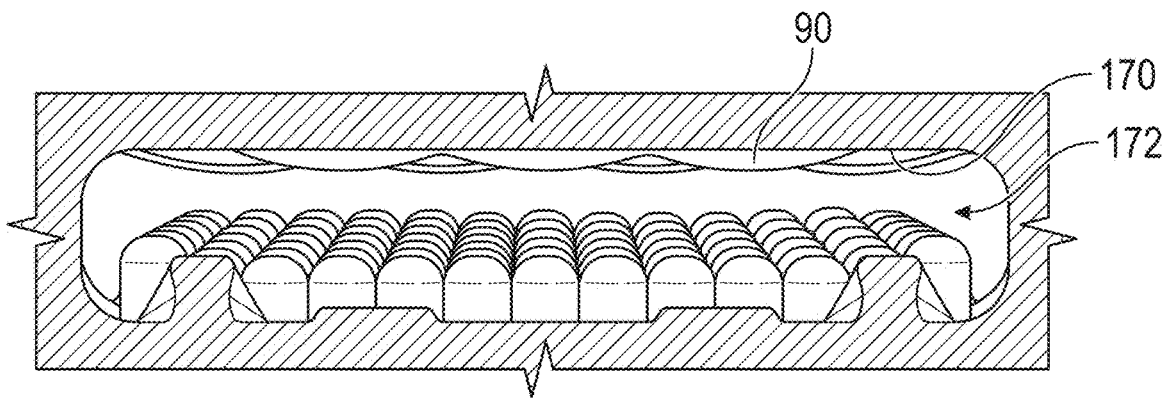

Referring now to at least FIGS. 39-41 cooling features 90 in accordance with yet another embodiment of the present disclosure are illustrated. As illustrated in at least FIG. 39, a portion of an interior cavity of component of the gas turbine engine is illustrated. The component may be any component that requires cooling including but not limited to any one of the following: blade outer air seals (BOAS), vanes, blades and other components that are required to be cooled by a source of cooling air.

In this embodiment, the cooling features 90 may comprise a pair of features 142 that each extend from a surface of the channel 136 towards each other where a gap 144 is located between distal ends 146 of the pair of features 142. As illustrated in FIGS. 39-41, the distal ends 146 of the pair of features 142 extend upstream towards a direction of the cooling air flow, which is illustrated by arrow 148. Arrow 150 also defines a height of the distal end 146 facing the cooling air flow. Again, air turbulence and enhanced cooling is provided by these features 90.

Referring now to at least FIGS. 42-46 cooling features 90 in accordance with yet another embodiment of the present disclosure are illustrated. As illustrated in at least FIGS. 45 and 46, a portion of an interior cavity of component of the gas turbine engine is illustrated. The component may be any component that requires cooling including but not limited to any one of the following: blade outer air seals (BOAS), vanes, blades and other components that are required to be cooled by a source of cooling air.

In this embodiment, the cooling features 90 may comprise a wedge shape that has a triangular base that has an upstream portion and a downstream portion, the upstream portion extending further from a surface 92 of the component than the downstream portion. This height is illustrated by arrows 152. This feature has a pair of channels 154 located in side walls 156 of the feature 90. The pair of channels 154 taper downwardly towards the downstream end of the feature 90. Also shown is that the upstream end of the feature has an undercut portion 158, which faces the direction of the cooling airflow illustrated by arrow 160. Again, air turbulence and enhanced cooling is provided by these features 90.

Referring now to at least FIGS. 47-51, cooling features 90 in accordance with yet another embodiment of the present disclosure are illustrated. As illustrated in at least FIG. 47, a portion of an interior cavity of component of the gas turbine engine is illustrated. The component may be any component that requires cooling including but not limited to any one of the following: blade outer air seals (BOAS), varies, blades and other components that are required to be cooled by a source of cooling air.

In this embodiment, the cooling features 90 may comprise a plurality of features 90 located on an upper surface of 170 of a cavity or channel 172 extending through the component. Here the cooling features are shaped as a plurality of rounded or circular protrusions that extend from the upper surface 170. As illustrated in at least FIG. 51, the cooling features 90 located on the upper surface of the cavity may be used in combination with any of the cooling features 90 mentioned above that extend from an opposite surface, which may be surface 92 as mentioned above. Again, air turbulence and enhanced cooling is provided by these features 90.

Figure 52:
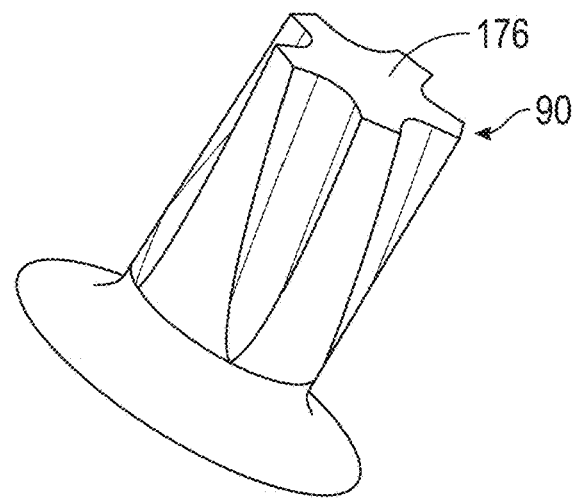
FIGS. 52-54 illustrate cooling features in accordance with yet another embodiment of the present disclosure.
Figure 53:
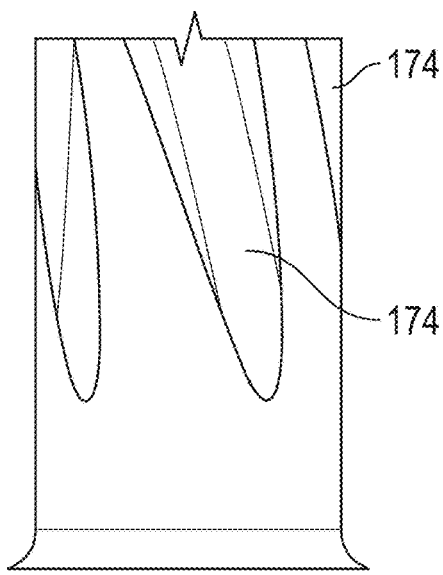
Figure 54:
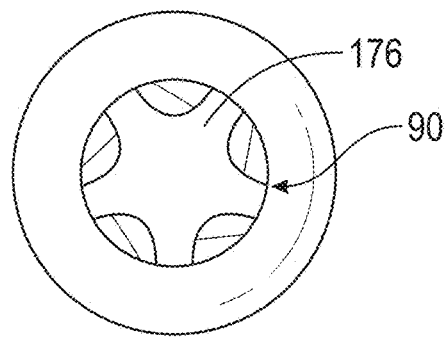

Referring now to at least FIGS. 52-54 cooling features 90 in accordance with yet another embodiment of the present disclosure are illustrated. Here the cooling features 90 may comprise a pin with a plurality of grooves 174 that are formed into the peripheral surface of the pin. The groove are curved so that they twist either clockwise or counter clockwise when viewed from a top surface 176 of the pin. As illustrated, the placement of the grooves in the surface of the pin results in a star shaped pattern at the top surface 176 of the pin. Again, air turbulence and enhanced cooling is provided by these features 90.

Figure 55:
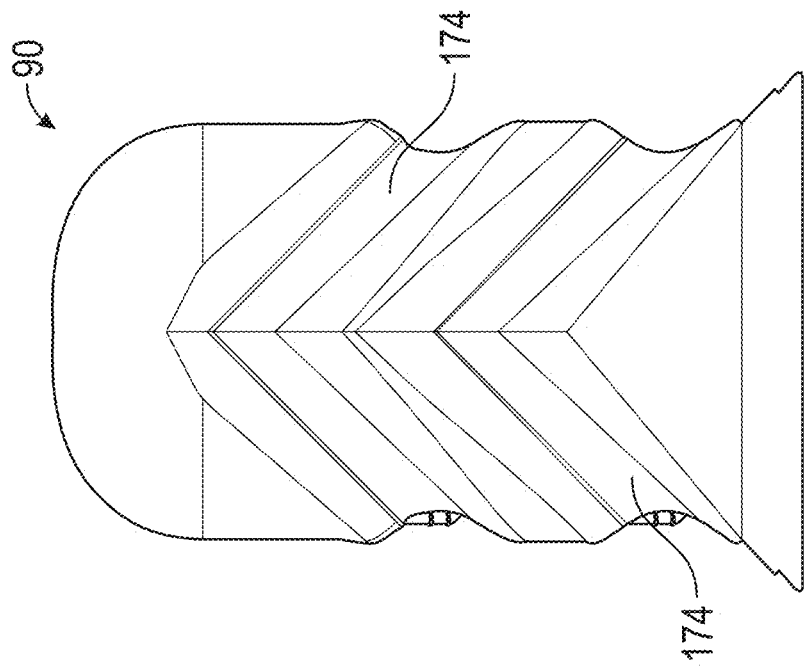
FIGS. 55 and 56 illustrate cooling features in accordance with yet another embodiment of the present disclosure.
Figure 56:
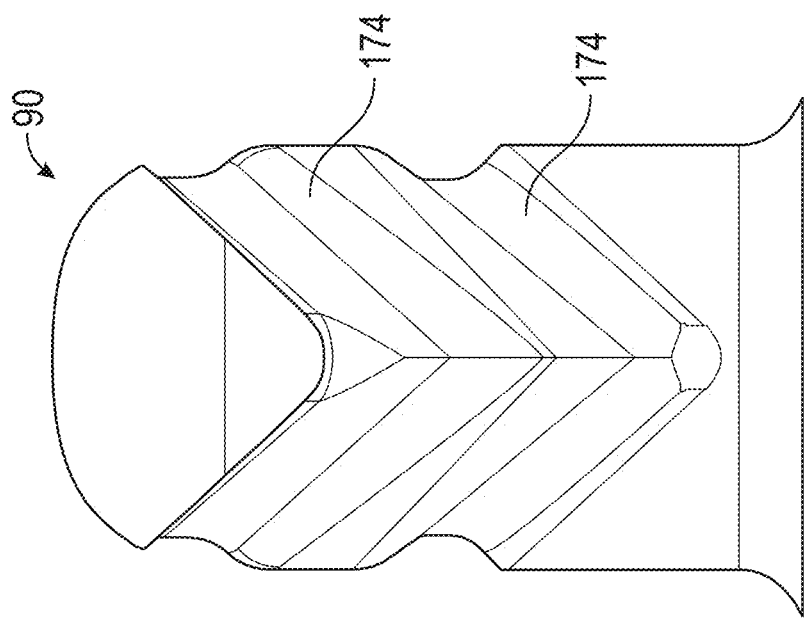

Referring now to at least FIGS. 55 and 56 cooling features 90 in accordance with yet another embodiment of the present disclosure are illustrated. Here the cooling features 90 may comprise a pin with a plurality of grooves 174 that are formed into the peripheral surface of the pin. Here the grooves 174 are configured such that "V" shapes or inverted "V" shapes are formed in the surface of the cooling pin 90. Again, air turbulence and enhanced cooling is provided by these features 90.

Figure 57:
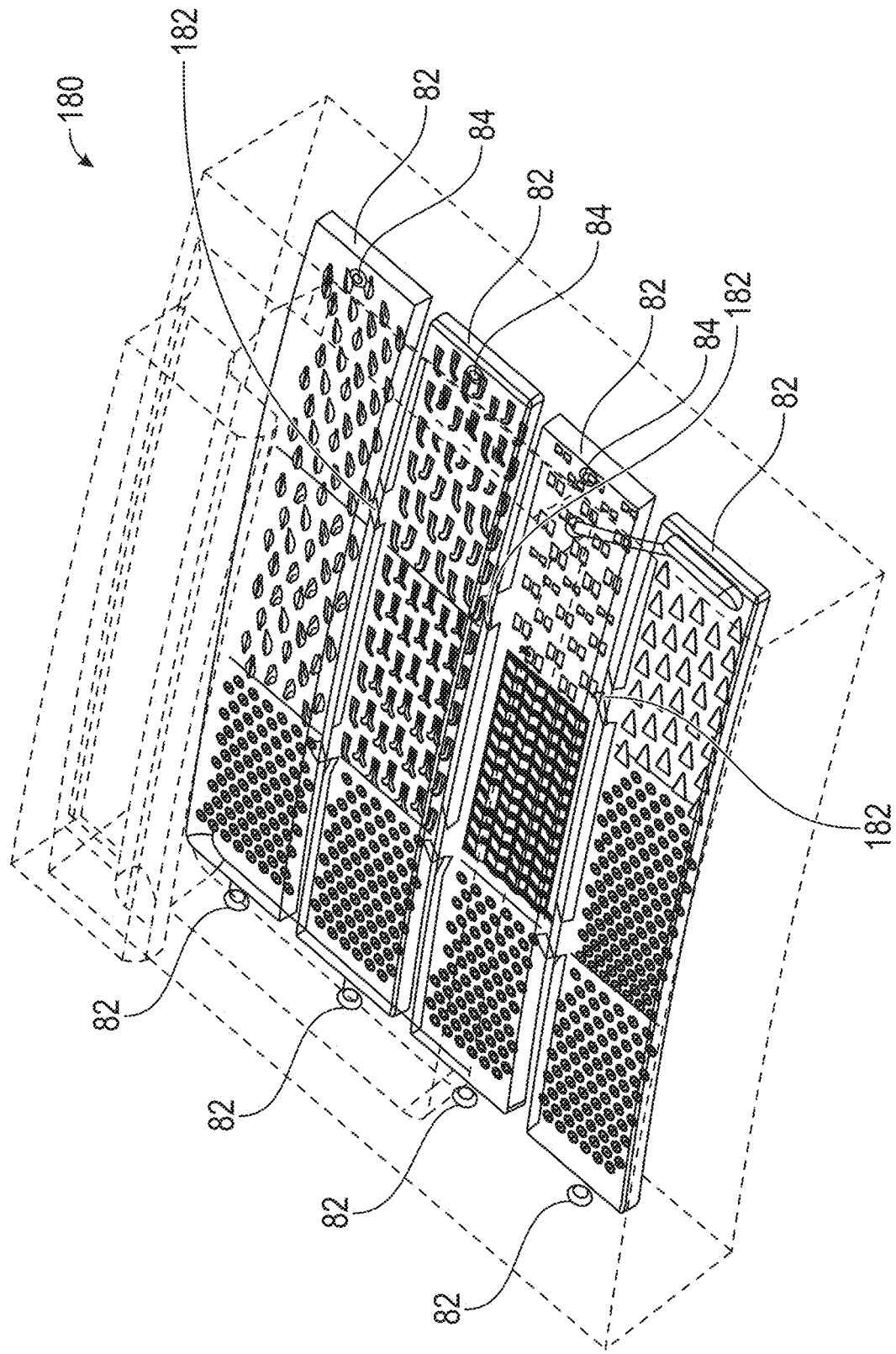
FIG. 57 illustrates a component for use in the gas turbine engine.

Referring now to FIG. 57 a component 180 for use in the gas turbine engine 20 is illustrated. As mentioned above the component 180 may be any component that requires cooling including but not limited to any one of the following: blade outer air seals (BOAS) 75, vanes 70, blades 74 and other components that are required to be cooled by a source of cooling air. As mentioned above, the component may have a plurality of channels 82 with at least one inlet opening 84 such that cooling air flow is directed through the channels 82 that extend internally in the component. The internal cooling features 90 extend from a surface of the channels in order to create turbulences in the cooling air flow which enhances convection. The channels 82 are in fluid communication with the at least one inlet opening 84 and at least one outlet opening 88. The cooling air exiting the at least one outlet opening 88 may be used for surface film cooling. The at least one outlet opening 88 may be located away from the at least one inlet opening 84 such that maximum cooling efficiently can be achieved internally before the cooling air exits the channel 82 via the at least one outlet opening 88. Each of the channels 82 can be configured to have cooling features 90 in accordance with any of the aforementioned embodiments disclosed herein. The cooling features 90 illustrated in FIG. 57 are illustrated with solid lines as the exterior of the component 180 is illustrated in phantom. In some embodiments, the channels 82 may be in fluid communication with each other via passageways 182.

Figure 58:
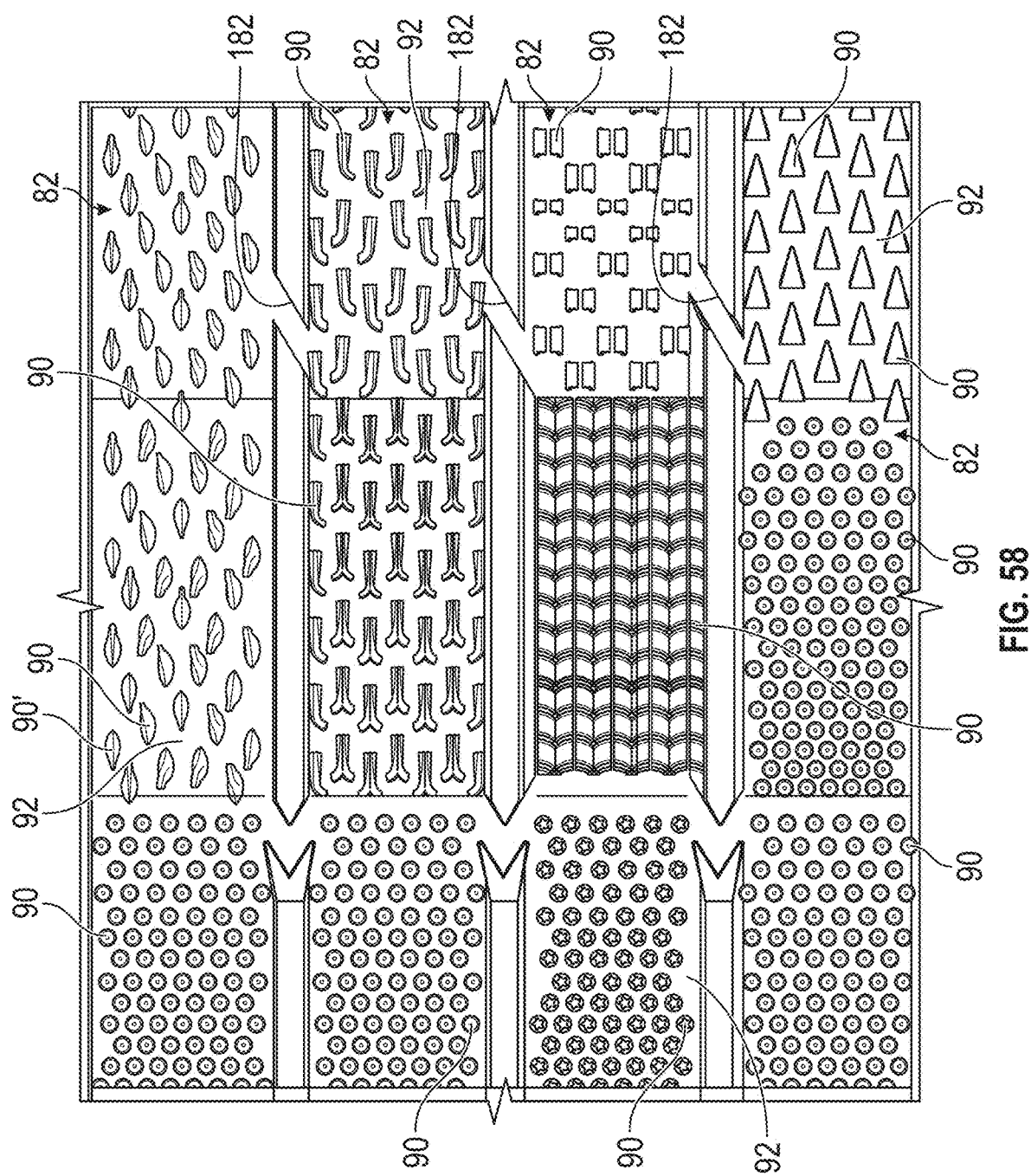
FIG. 58 illustrates a portion of the component illustrated in FIG. 57.

FIG. 58 illustrates a portion of the component illustrated in FIG. 57. For example, FIG. 58 is a top view of the surface 92 where the cooling features 90 protrude therefrom. Again, any combination of the aforementioned cooling features 90 may be located within the component 180. Alternatively only one of the aforementioned cooling features 90 may be located within the component 180.

While the previous embodiments refer to internal cooling channels 82 having any one of the aforementioned cooling features 90. An alternative embodiment contemplates these cooling features 90 or any combination thereof being located on an exterior surface of a component of a gas turbine engine that requires cooling. For example, these features could be applied on an exterior face of a part, which in one embodiment may not be cored with internal cavities. Thus, and in one non-limiting embodiment, the cooling features 90 are only located on an exterior surface of a component. For example and referring to the aforementioned FIGS. the surface 92 could be an exterior surface of a component. Alternatively, the cooling features 90 may be located on both an external and internal surface of the component. Still further and in yet another alternative, they may be only located in an internal cooling channel(s) as described above.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A component for a gas turbine engine, comprising:
at least one internal cavity extending through the component, the internal cavity having at least one inlet opening and at least one outlet opening each being in fluid communication with the at least one internal cavity;
a plurality of cooling features extending from a surface of the at least one internal cavity, the plurality of cooling features comprising:
a plurality of airfoil shaped features that extend upwardly from the surface of the at least one internal cavity each of the plurality of airfoil shaped features includes a base portion that extends upwardly away from the surface and the base portion also extends horizontally with respect to the surface such that a tail portion is formed, the tail portion creates an undercut portion located underneath the tail portion and a first portion of the plurality of airfoil shaped features are oriented such that the tail portion comprises an upstream end of the first portion of the plurality of airfoil shaped features and a second portion of the plurality of airfoil shaped features are oriented such that the tail portion comprises a downstream end of the second portion of the plurality of airfoil shaped features.

2. The component according to claim 1, wherein a third portion of the plurality of airfoil shaped features has a tail portion that is shifted and/or rotated with respect to a base portion of the third portion of the plurality of airfoil shaped features.

3. The component according to claim 1, further comprising a plurality of cooling features comprising a plurality features having a curved or "J" shaped base that extends upwardly from the surface of the at least one internal cavity, a plurality features having a double curved or symmetrically "J" shaped base that extends upwardly from the surface of the at least one internal cavity, and a plurality features having a base that extends upwardly from the surface of the at least one internal cavity with a curved portion that defines an opening therethrough, wherein the plurality features having the curved or "J" shaped base have an undercut portion located below a distal end of the curved or "J" shaped base.

4. The component according to claim 3, wherein the plurality features having the double curved or symmetrically "J" shaped base have an undercut portion located below a distal end of the curved or "J" shaped base.

5. The component according to claim 3, wherein each of the plurality features having the curved portion have surfaces that are angled inwardly toward each other as they extend from either an upstream end or a downstream end such that a narrow cross section of the base is provided at the opening.

6. The component according to claim 5, wherein each of the plurality features having the curved portion have a gap provided at a top of the curved portion.

7. The component according to claim 3, wherein each of the plurality features having the curved portion have a width that varies.

8. The component according to claim 1, wherein a plurality of cooling features are located on an upper surface spaced from the surface, the plurality of cooling features located on the upper surface are rounded or circular protrusions that extend from the upper surface.

9. The component according to claim 1, wherein the component is one of a blade outer air seal, a turbine blade, and vane.

10. The component according to claim 1, further comprising a plurality of chevron shaped trip strips that are located in a channel, the plurality of chevron shaped trip strips are spaced from each other such that a "U" shaped passage is formed therebetween and each chevron shaped trip strip of the plurality of chevron shaped trip strips has a top portion that curls inwardly towards the channel and a plurality of pairs of features that each extend from a surface of another channel towards each other where a gap is located between distal ends of the plurality of pairs of features.

11. A gas turbine engine, comprising the component of claim 1, wherein the component is configured to receive a cooling air flow.

12. A component for a gas turbine engine, comprising:
at least one internal cavity extending through the component, the internal cavity having at least one inlet opening and at least one outlet opening each being in fluid communication with the at least one internal cavity;
a plurality of cooling features extending from a surface of the at least one internal cavity, the plurality of cooling features comprising:
a plurality of wedge shaped features that extend upwardly from the surface of the at least one internal cavity each of the plurality of wedge shaped features having a triangular base that has an upstream portion and a downstream portion, the upstream portion extending further from the surface than the downstream portion, wherein each of the plurality of wedge shaped features have a pair of channels located in side walls of each of the plurality of wedge shaped features and the pair of channels taper downwardly towards the downstream portion.

13. The component according to claim 12, wherein each of the plurality of wedge shaped features each have an undercut portion located at the upstream portion.

14. The component according to claim 12, wherein the component is one of a blade outer air seal, a turbine blade, and vane.

15. The component according to claim 12, further comprising a plurality of cooling features comprising a plurality features having a curved or "J" shaped base that extends upwardly from the surface of the at least one internal cavity, a plurality features having a double curved or symmetrically "J" shaped base that extends upwardly from the surface of the at least one internal cavity, and a plurality features having a base that extends upwardly from the surface of the at least one internal cavity with a curved portion that defines an opening therethrough, wherein the plurality features having the curved or "J" shaped base have an undercut portion located below a distal end of the curved or "J" shaped base.

16. The component according to claim 12, further comprising a plurality of chevron shaped trip strips that are located in a channel, the plurality of chevron shaped trip strips are spaced from each other such that a "U" shaped passage is formed therebetween and each chevron shaped trip strip of the plurality of chevron shaped trip strips has a top portion that curls inwardly towards the channel and a plurality of pairs of features that each extend from a surface of another channel towards each other where a gap is located between distal ends of the plurality of pairs of features.

17. A component for a gas turbine engine, comprising:
at least one internal cavity extending through the component, the internal cavity having at least one inlet opening and at least one outlet opening each being in fluid communication with the at least one internal cavity;
a plurality of cooling features extending from a surface of the at least one internal cavity, the plurality of cooling features comprising:
a first plurality of pins with a plurality of grooves that are formed into a peripheral surface of each of the first plurality of pins and a second plurality of pins with a plurality of grooves that are formed into a peripheral surface of each of the second plurality of pins, the plurality of grooves formed in the peripheral surface of each of the second plurality of pins are configured such that "V" shapes or inverted "V" shapes are formed in the peripheral surface of each of the second plurality of pins, wherein the plurality of grooves that are formed into the peripheral surface of each of the first plurality of pins are curved so that they twist either clockwise or counter clockwise with respect to a top surface of the first plurality of pins.

18. The component according to claim 17, wherein the component is one of a blade outer air seal, a turbine blade, and vane.

19. The component according to claim 17, further comprising a plurality of cooling features comprising a plurality features having a curved or "J" shaped base that extends upwardly from the surface of the at least one internal cavity, a plurality features having a double curved or symmetrically "J" shaped base that extends upwardly from the surface of the at least one internal cavity, and a plurality features having a base that extends upwardly from the surface of the at least one internal cavity with a curved portion that defines an opening therethrough, wherein the plurality features having the curved or "J" shaped base have an undercut portion located below a distal end of the curved or "J" shaped base.

20. The component according to claim 17, further comprising a plurality of chevron shaped trip strips that are located in a channel, the plurality of chevron shaped trip strips are spaced from each other such that a "U" shaped passage is formed therebetween and each chevron shaped trip strip of the plurality of chevron shaped trip strips has a top portion that curls inwardly towards the channel and a plurality of pairs of features that each extend from a surface of another channel towards each other where a gap is located between distal ends of the plurality of pairs of features.

21. A component for a gas turbine engine, comprising:
a plurality of cooling features extending from an exterior surface of the component, the plurality of cooling features are formed in accordance with at least one of the following groups:
i) a plurality of wedge shaped features that extend upwardly from the exterior surface, each of the plurality of wedge shaped features having a triangular base that has an upstream portion and a downstream portion, the upstream portion extending further from the exterior surface than the downstream portion wherein each of the plurality of wedge shaped features have a pair of channels located in side walls of each of the plurality of wedge shaped features and the pair of channels taper downwardly towards the downstream portion;
ii) a first plurality of pins with a plurality of grooves that are formed into a peripheral surface of each of the first plurality of pins and a second plurality of pins with a plurality of grooves that are formed into a peripheral surface of each of the second plurality of pins the plurality of grooves formed into the peripheral surface of each of the second plurality of pins are configured such that "V" shapes or inverted "V" shapes are formed in the peripheral surface of each of the second plurality of pins, wherein the plurality of grooves that are formed into the peripheral surface of each of the first plurality of pins are curved so that they twist either clockwise or counter clockwise with respect to a top surface of the first plurality of pins; and
iii) a plurality of airfoil shaped features that extend upwardly from the exterior surface of the of the component each of the plurality of airfoil shaped features includes a base portion that extends upwardly away from the exterior surface of the component and the base portion also extends horizontally with respect to the exterior surface of the component such that a tail portion is formed, the tail portion creates an undercut portion located underneath the tail portion and a first portion of the plurality of airfoil shaped features are oriented such that the tail portion comprises an upstream end of the first portion of the plurality of airfoil shaped features and a second portion of the plurality of airfoil shaped features are oriented such that the tail portion comprises a downstream end of the second portion of the plurality of airfoil shaped features.

* * * * *